(12) United States Patent
Ellis

(10) Patent No.: US 11,979,089 B2
(45) Date of Patent: May 7, 2024

(54) RESONANT COCKCROFT-WALTON VOLTAGE CONVERTERS USING MULTI-PHASE CLOCKING TECHNIQUES

(71) Applicant: The Regents of the University of California, Oakland, CA (US)

(72) Inventor: Nathan Miles Ellis, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 192 days.

(21) Appl. No.: 17/393,291

(22) Filed: Aug. 3, 2021

(65) Prior Publication Data

US 2022/0038006 A1 Feb. 3, 2022

Related U.S. Application Data

(60) Provisional application No. 63/060,571, filed on Aug. 3, 2020.

(51) Int. Cl.
*H02M 3/158* (2006.01)
*H02M 1/00* (2006.01)
*H02M 1/084* (2006.01)

(52) U.S. Cl.
CPC ......... *H02M 3/158* (2013.01); *H02M 1/0009* (2021.05); *H02M 1/0058* (2021.05); *H02M 1/0095* (2021.05); *H02M 1/084* (2013.01)

(58) Field of Classification Search
CPC .. H02M 3/158; H02M 1/0009; H02M 1/0058; H02M 1/0095; H02M 1/084; H02M 3/07; Y02B 70/10
See application file for complete search history.

(56) References Cited

U.S. PATENT DOCUMENTS

| | | | |
|---|---|---|---|
| 9,917,517 B1 * | 3/2018 | Jiang | H02M 1/34 |
| 10,122,256 B1 * | 11/2018 | Babazadeh | H02M 1/083 |
| 2012/0319478 A1 * | 12/2012 | Gentchev | H02M 1/14 323/361 |

(Continued)

FOREIGN PATENT DOCUMENTS

WO 2020149870 * 7/2020 ............. H02M 1/00

OTHER PUBLICATIONS

Attached Dai Heping WO 2020149870 A1. (Year: 2020).*

*Primary Examiner* — Emily P Pham
(74) *Attorney, Agent, or Firm* — Park, Vaughan, Fleming & Dowler LLP

(57) ABSTRACT

A Cockcroft-Walton (CW) switching voltage converter is disclosed. This CW switching converter includes a set of capacitors; an inductor coupled between an input voltage source and the set of capacitors; a set of switches; and an N-phase control module coupled to the set of switches. In some embodiments, each switch is controlled by the N-phase control module which is configured to sequentially and periodically effectuate a set of N voltage-conversion phases in a sequence of switching cycles. Note that each switching cycle effectuates a voltage conversion through the set of N voltage-conversion phases, wherein N is the conversion ratio of the CW switching voltage converter. Moreover, the N-phase control module is configured to effectuate a phase transition from a current phase to a subsequent phase when a zero-current switching (ZCS) condition on a given switch is met.

25 Claims, 14 Drawing Sheets

(56) References Cited

U.S. PATENT DOCUMENTS

| | | | |
|---|---|---|---|
| 2014/0232359 A1* | 8/2014 | Dash | H02M 1/14 363/21.09 |
| 2015/0077085 A1* | 3/2015 | Chen | H02M 3/158 323/299 |
| 2015/0097507 A1* | 4/2015 | Kim | H02M 3/1582 318/504 |
| 2015/0115926 A1* | 4/2015 | Song | H02M 1/14 323/290 |
| 2016/0079868 A1* | 3/2016 | Yeh | H02M 3/158 323/235 |
| 2019/0115830 A1* | 4/2019 | Giuliano | H02M 3/07 |
| 2020/0328675 A1* | 10/2020 | Seo | H02M 3/073 |
| 2021/0091679 A1* | 3/2021 | Li | H03F 3/245 |
| 2021/0211040 A1* | 7/2021 | Rainer | H02M 1/36 |

* cited by examiner

OP1

OP2

OP3

| Component | Description | Part Number |
|---|---|---|
| $S_{1-5}, S_9$ | eGaN FET, 40V, 16A, 5mΩ | EPC2049 |
| $S_{6-8}$ | eGaN FET, 100V, 16A, 7mΩ | EPC2045 |
| L | 68nH, 22A DC, 3.2mΩ | IHSR1616ABER68NM01 |
| $C_{1-4}$ | 5 x 1µF, 50V, X5R, 1608M | GRT188R61H105KE13 |
| $C_{OUT}$ | 15 x 0.1µF, 100V, X7R, 1608M | GCJ188R72A104KA01 |
| $U_1$ | 2A/4A, Level-Shift & Gate Driver | PE29102 |
| $C_{BP}$ | 1µF, 6.3V, X5R, 0603M | GRM033R60J105MEA2D |
| $R_G$ | 2.4Ω, 5%, 1/20W, 0603M | RC0201JR-072R4L |
| $R_{Z1-5,9}$ | 82kΩ, 1%, 1/20W, 0603M | RC0201FR-0782KL |
| $R_{Z6-8}$ | 150kΩ, 1%, 1/20W, 0603M | RMCF0201FT150K |
| $D_1$ | Diode, 100V, 100mA, 0603M | CDSZC01100-HF |
| $D_Z$ | 5.6V Zener Diode, 100mW, 0603M | SDZT15R5.6 |
| $M_1$ | MOSFET, 60V, 320mA, 2Ω | DMN62D1LFB-7B |

FIG. 14

RESONANT COCKCROFT-WALTON VOLTAGE CONVERTERS USING MULTI-PHASE CLOCKING TECHNIQUES

CROSS-REFERENCE TO RELATED APPLICATION

This application claims the benefit of priority under 35 U.S.C. 119(e) to U.S. Provisional Patent Application Ser. No. 63/060,571, entitled "MULTIPLE-PHASE SWITCHING TECHNIQUE FOR A SWITCHED-CAPACITOR VOLTAGE CONVERTER THAT ACHIEVES FULL-ZERO-CURRENT SWITCHING," filed on 3 Aug. 2020, the contents of which are incorporated by reference herein.

BACKGROUND

Field

The disclosed embodiments generally relate to the designs of DC-DC voltage converters. More specifically, the disclosed embodiments relate to the design of a high efficiency and high-power density Cockcroft-Walton voltage converter comprising at least one resonant inductor, and controlled by various multi-phase switching techniques.

Related Art

Switched-mode DC-to-DC (or switching DC-DC) converters are used to convert one DC voltage to another DC voltage, which can be either an increased voltage (in step-up mode) or a decreased voltage (in step-down mode), by temporarily storing an input energy and then releasing the energy to the output at a different voltage. The energy storage in switching DC-DC converters may be implemented with inductors, transformers, or capacitors. For example, switched-capacitor (SC) DC-DC converters use only capacitors as energy-transfer devices to achieve both high efficiency and small device size. However, SC DC-DC converters can become highly inefficient under heavy load conditions due to the voltage mismatch and transient current pulses that occur when initiating a new switching phase. Note that this reduced efficiency resulting from rapid charge distribution loss is often referred to as the "slow switching limit" (SSL) operation of the SC DC-DC converters, because the losses become worse as the switching frequencies decrease.

To mitigate the SSL losses at lower switching frequencies, several hybrid DC-DC converters that employ an inductor in conjunction with a switched-capacitor stage have been proposed, which have shown improved energy transfer efficiencies. Hybrid-inductor-capacitor (LC) switching DC-DC converters are also known to be capable of achieving high power densities because their efficient utilization of the energy densities of the passive components and elimination of transient inrush currents responsible for the aforementioned losses in the conventional switched-capacitor DC-DC converters. Note that hybrid-LC switching converters allow for both resonant operations and soft-charging operations, which can be utilized to achieve both zero-current switching (ZCS) and zero-voltage switching (ZVS) to significantly improve conversion efficiency compared to hard-charged capacitor-only converters. For example, an inductor may be placed at the input of a conventional SC DC-DC converter to effectuate ZCS or soft-charging through a two-phase switching technique. Unfortunately, conventional two-phase switching technique used in conjunction with a hybrid-LC switching converter cannot effectuate full ZCS operations across all switches within the switching converter without applying split-phase switching techniques at time sensitive points throughout both phases.

Hence, what is needed is an improved hybrid-LC switching converter design that does not suffer from the above-mentioned drawbacks of the existing switching converter designs.

SUMMARY

This disclosure provides several systems and techniques for controlling the voltage conversion operation of a Cockcroft-Walton switching voltage converter through a periodic phase sequence and under a resonant zero-current switching (ZCS) condition to enable soft-charging, reduce or eliminate transient current pulses, and achieve high conversion frequencies. The disclosed systems and techniques include N-phase switching/clocking system and technique which use multi-phase switching configurations comprising a N-phase progression sequence to control the switching operation of a hybrid inductor-capacitor (LC) Cockcroft-Walton (CW) 1:N voltage converter. Because N-resonant cycles are required within a full operating period of this switching control scheme, the disclosed N-phase switching/clock system and technique can reduce an overall switching frequency of the CW switching converter, making it suitable for combining multiple switching schemes for improved light-load efficiency.

This disclosure also provides split-phase switching/clocking system and technique which also use multi-phase switching configurations comprising a two-level phase sequence (i.e., major phases which are divided into two or more sub-phases) to control the switching operation of the hybrid CW 1:N voltage converter. Additionally, a comparative study of the disclosed N-phase switching technique and the split-phase switching technique is also provided. The analysis, simulations, and empirical results demonstrate that the disclosed split-phase switching technique generally yields the highest efficiencies for the heavy-load conditions, whereas the disclosed N-phase switching technique generally yields superior light-load efficiency when using the same hardware. Consequently, maximized efficiencies can be achieved for any given load condition by judiciously selecting either the N-phase switching technique or the split-phase switching technique based on the load conditions.

Moreover, a hybrid switching scheme that combines both the disclosed N-phase switching technique and the split-phase switching technique is provided which has the ability to seamlessly switch between the two disclosed switching techniques for different operating conditions. This hybrid switching scheme in conjunction with pulse-frequency modulation (PFM) and/or other light-load techniques can provide improved CW converter performances over a wide operation range.

In one aspect, a Cockcroft-Walton (CW) switching voltage converter is disclosed. This CW switching voltage converter includes a set of capacitors; at least one inductor coupled between an input voltage source and the set of capacitors; a set of switches; and an N-phase control module 302 coupled to the set of switches. In some embodiments, each switch in the set of switches is controlled by the N-phase control module 302 which is configured to sequentially and periodically effectuate a set of N voltage-conversion phases in a sequence of switching cycles. Note that each switching cycle in the sequence of switching cycles effectuates a voltage conversion through the set of N voltage-conversion phases, wherein N is the conversion ratio of the CW switching voltage converter. Moreover, the N-phase control module 302 is configured to effectuate a phase transition from a current phase in the set of N voltage-conversion phases to a subsequent phase in the set of N voltage-conversion phases when a current through the at least one inductor in the current phase decreases to zero or substantially zero, thereby effectively achieving full zero-current switching (ZCS) across the set of switches and the set of N voltage-conversion phases.

In some embodiments, each phase in the set of N voltage-conversion phases is configured to include only one closed voltage loop that is composed of, the input voltage source, the at least one inductor, a subset of the set of capacitors, and a subset of the set of switches.

In some embodiments, each phase in the set of N voltage-conversion phases is associated with a phase duration that is determined based on a natural resonant period of the associated closed voltage loop.

In some embodiments, the phase duration of the phase in the set of N voltage-conversion phases is equal to or substantially equal to 50% of the natural resonant period of the associated closed voltage loop.

In some embodiments, the phase duration of the phase in the set of N voltage-conversion phases is less than 50% of the natural resonant period of the associated closed voltage loop so that the current through the at least one inductor remains positive throughout a switching cycle.

In some embodiments, the CW switching voltage converter further includes a current-sensing circuitry coupled to the at least one inductor and configured to detect a ZCS condition in the at least one inductor in each phase of the set of N voltage-conversion phases.

In some embodiments, the N-phase control module is configured to effectuate a phase transition when the output value of the current sensing circuitry reaches a minimum value.

In some embodiments, the set of N voltage-conversion phases is configured such that an earlier phase in the set of N voltage-conversion phases generally includes fewer capacitors than a number of capacitors included in a latter phase in the set of N voltage-conversion phases.

In some embodiments, the N-phase control module is configured to add one or more additional voltage-conversion phases into each switching cycle, and the one or more additional phases are combined with the set of N voltage-conversion phases to regulate an output voltage of the CW switching voltage converter to a desired level.

In some embodiments, the N-phase switching technique operates using three or more voltage-conversion phases, whereby N≥3.

In some embodiments, the CW switching voltage converter includes a 1:N step-up CW switching voltage converter.

In some embodiments, the CW switching voltage converter includes a N:1 step-down CW switching voltage converter.

In some embodiments, the N-phase control module is further configured to reduce the number of phases within each switching cycle by combining two phases in the set of N voltage-conversion phases into a single phase and subsequently using the set of N−1 voltage-conversion phases for each switching cycle.

In some embodiments, the N-phase control module is configured to start each phase in the set of N voltage-conversion phases under a first ZCS condition and terminate the same phase under a second ZCS condition, thereby increasing conversion efficiencies of the voltage converter by elimination transient current pulses typically associated with phase transitions and increasing conversion efficiencies.

In some embodiments, an output of the CW switching voltage converter is only coupled to the input voltage source during the Nth phase of the set of N voltage-conversion phases.

In another aspect, another CW switching voltage converter is disclosed. This CW switching voltage converter includes a set of capacitors; at least one inductor coupled between an input voltage source and the set of capacitors; a set of switches; and a split-phase control module coupled to the set of switches. In some embodiments, each switch in the set of switches is controlled by the split-phase control module which is configured to sequentially and periodically effectuate a set of N voltage-conversion phases in a sequence of switching cycles. Note that each switching cycle in the sequence of switching cycles effectuates a voltage conversion through the set of N voltage-conversion phases, wherein N is the conversion ratio of the CW switching voltage converter.

In some embodiments, the set of N voltage-conversion phases is divided into a first major phase and a second major phase, which are associated a first and a second complex configurations of the set of switches, respectively. The first major phase is further divided into a first set of sub-phases which is composed of a first sub-phase having the first complex configuration and one or more additional sub-phases corresponding to one or more sub-configurations of the first complex configuration. The second major phase is further divided into a second set of sub-phases which is composed of a second sub-phase having the second complex configuration and one or more additional sub-phases corresponding to one or more sub-configurations of the second complex configuration.

In some embodiments, the split-phase control module is configured to effectuate a major phase transition between the first major phase and the second major phase when a current through the at least one inductor decreases to zero or substantially zero, whereby effectively achieving zero-current switching (ZCS) across the set of switches.

In some embodiments, the split-phase control module is further configured to effectuate a sub-phase transition between two sub-phases within either the first major phase or the second major phase when a voltage across a switch being added during the sub-phase transition has becomes zero, whereby effectively achieving zero-voltage switching (ZVS) on the added switch.

In some embodiments, each major phase of the two major phases is configured to include two or more closed voltage loops, wherein each of the two or more closed voltage loops is further composed of a subset of the set of capacitors and a subset of the set of switches.

In some embodiments, each major phase of the two major phases is associated with a phase duration that is determined based on a natural resonant period of the associated complex configuration.

In some embodiments, the phase duration of a major phase of the two major phases is equal to or substantially equal to 50% of the natural resonant period of the associated complex configuration.

In some embodiments, the CW switching voltage converter further includes a current sensing circuitry coupled to at least one inductor and configured to detect a ZCS condition required to effectuate a corresponding major phase transition.

In some embodiments, the first major phase and the second major phase correspond to two phases in a conventional two-phase switching technique for a conventional CW switching voltage converter of the same conversion ratio.

In some embodiments, the set of N voltage-conversion phases is arranged in an order such that: (1) the first major phase precedes the second major phase; (2) the one or more additional sub-phases of the first major phase precede the first sub-phase; and (3) the one or more additional sub-phases of the second major phase precede the second sub-phase.

In some embodiments, this CW switching voltage converter includes a 1:N step-up CW switching voltage converter.

In some embodiments, this CW switching voltage converter includes a N:1 step-down CW switching voltage converter.

In some embodiments, an output of the CW switching voltage converter is only coupled to the input voltage source during the Nth phase of the set of N voltage-conversion phases.

In some embodiments, the first major phase is split into N/2 sub-phases when N is even, and (N−1)/2 sub-phases when N is odd; and wherein the second major phase is split into N/2 sub-phases when N is even, and (N+1)/2 sub-phases when N is odd, wherein N is the conversion ratio of the CW switching voltage converter.

In yet another aspect, a switched-capacitor voltage converter. This switched-capacitor voltage converter can include a Cockcroft-Walton voltage converter, which includes an inductor placed in proximity to an input for the step-up voltage conversion or placed in proximity to an output for the step-down voltage conversion. Note that this voltage converter is configured to operate using an N-phase switching technique, and is also configured to operate using a split-phase switching technique. In some embodiments, this voltage converter is configured to use the split-phase switching technique when a power output of the voltage converter exceeds an empirically determined and/or predetermined efficiency tradeoff point, and is otherwise configured to use the N-phase switching technique when the power output equals or falls below the efficiency tradeoff point.

In some embodiments, during the N-phase technique, switches in the voltage converter are controlled so that only one current path exists through the voltage converter and the inductor during each of the N phases. Moreover, a transition from a first phase to a second phase during the N-phase technique takes place when current through the inductor equals zero, whereby full zero-current switching is achieved.

In some embodiments, the transitions between subsequent phases alternatively take place at a higher frequency than a natural self-resonant frequency of the voltage converter to facilitate soft-charging.

In some embodiments, additional phases may be added or an existing phase may be removed in order to regulate the output voltage to a desired value.

In some embodiments, during the split-phase technique, switches in the voltage converter are controlled so that the voltage converter transitions between two major phases, which are associated with different configurations of the switches, wherein each major phase is split into sub-phases, which are associated with different sub-configurations of the switches. Moreover, a transition between the two major phases takes place when a current through the inductor equals zero, whereby full zero-current switching is achieved; and a transition between two sub-phases within each of the two major phase takes place when a voltage across a switch being added during the transition between the two sub-phases has becomes zero.

In some embodiments, the transitions between the two major phases alternatively take place at a higher frequency than a natural self-resonant frequency of the voltage converter to facilitate soft-charging.

In some embodiments, additional phases may be added or an existing phase may be removed in order to regulate the output voltage to a desired value.

In some embodiments, the two major phases include a first major phase, which is split into N/2 sub-phases when N is even, and (N−1)/2 sub-phases when N is odd; and a second major phase, which is split into N/2 sub-phases when N is even, and (N+1)/2 sub-phases when N is odd, wherein N is the conversion ratio of the switched-capacitor converter.

In some embodiments, additional Pulse Frequency Mode (PFM) and/or other light load switching techniques may also be incorporated to improve the light load efficiency of the switched-capacitor voltage converter.

In some embodiments, capacitors in the Cockcroft-Walton voltage converter are selected so that voltage ripple is maximized to take full advantage of capacitor energy density, subject to the constraint that voltage tolerances are not exceeded.

DESCRIPTION OF THE FIGURES

FIG. 14 lists the components used in the discrete hybrid 1:5 CW converter prototype in accordance with some embodiments.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Cockcroft-Walton (CW) Switched-Capacitor (SC) Converters

Figure 1A:
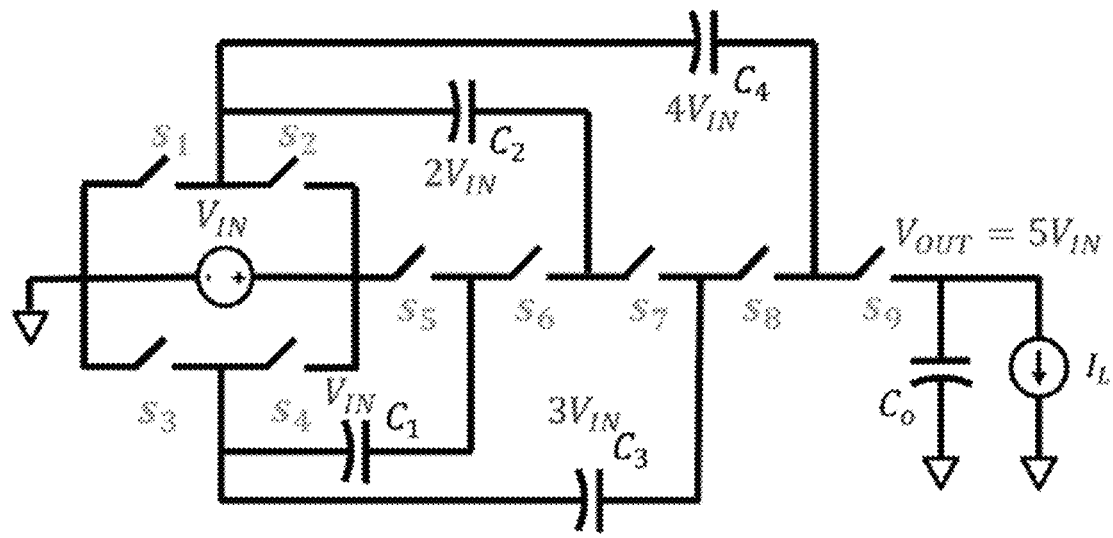
FIG. 1A shows a conventional 1:5 Dickson switched-capacitor (SC) DC-DC converter and the voltage stress on each of the fly capacitors.
Figure 1B:
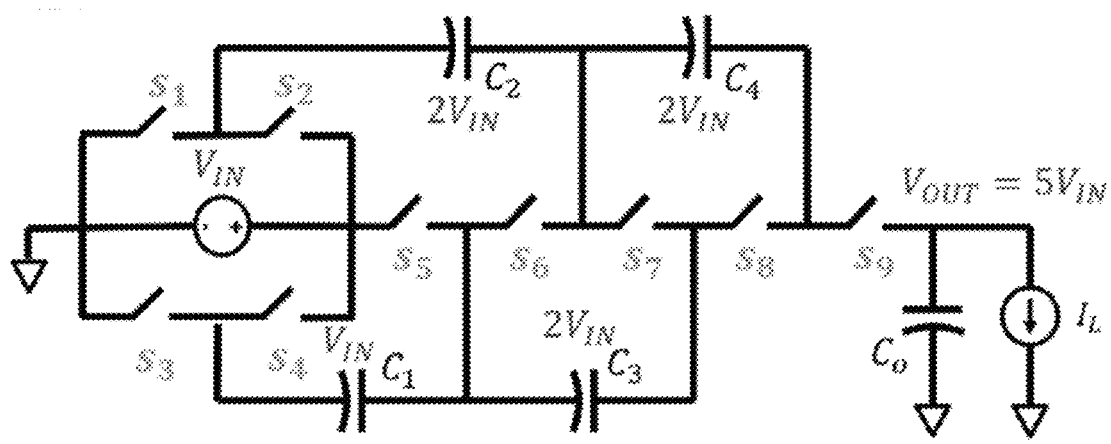
FIG. 1B shows a conventional 1:5 Cockcroft-Walton (CW) SC DC-DC converter and the voltage stress on each of the fly capacitors.

Generally speaking, the Cockcroft-Walton converter topology offers a significant reductions in voltage stress on fly capacitors at a given conversion ratio when compared with the Dickson converter topology at the same conversion ratio, particularly when the intended conversion ratio is relatively high. FIG. 1A shows a conventional 1:5 Dickson SC DC-DC converter and the voltage stress on each of the fly capacitors, whereas FIG. 1B shows a conventional 1:5 Cockcroft-Walton (CW) SC DC-DC converter and the voltage stress on each of the fly capacitors. As can be seen in FIG. 1A and FIG. 1B, each of the two converters includes four fly capacitors $C_1$, $C_2$, $C_3$, and $C_4$ and nine switches $S_1$ to $S_9$ which are selectively turned on or turned off during switching operations to transfer charge from the input to the output. However, the fly capacitors $C_1$, $C_2$, $C_3$, and $C_4$ in the Dickson SC converter have to tolerate voltages of $V_{IN}$, $2V_{IN}$, $3V_{IN}$, and $4V_{IN}$, respectively, wherein $V_{IN}$ is the input voltage in a step-up configuration. In contrast, the fly capacitors $C_1$, $C_2$, $C_3$, and $C_4$ in the CW SC converter only have to tolerate voltages of $V_{IN}$, $2V_{IN}$, $2V_{IN}$, and $2V_{IN}$, respectively. Moreover, the maximum voltage stress in the Dickson SC converter will increase with the conversion ratio, whereas the maximum voltage stress in the CW SC converter will remain at $2V_{IN}$. Note that this reduced voltage stress in the conventional CW converter topology can be a significant benefit for commonly-used multilayer ceramic chip capacitors (MLCCs), which can suffer more than 90% reduction in effective capacitance across the allowable voltage range in many commercial parts.

Figure 2:
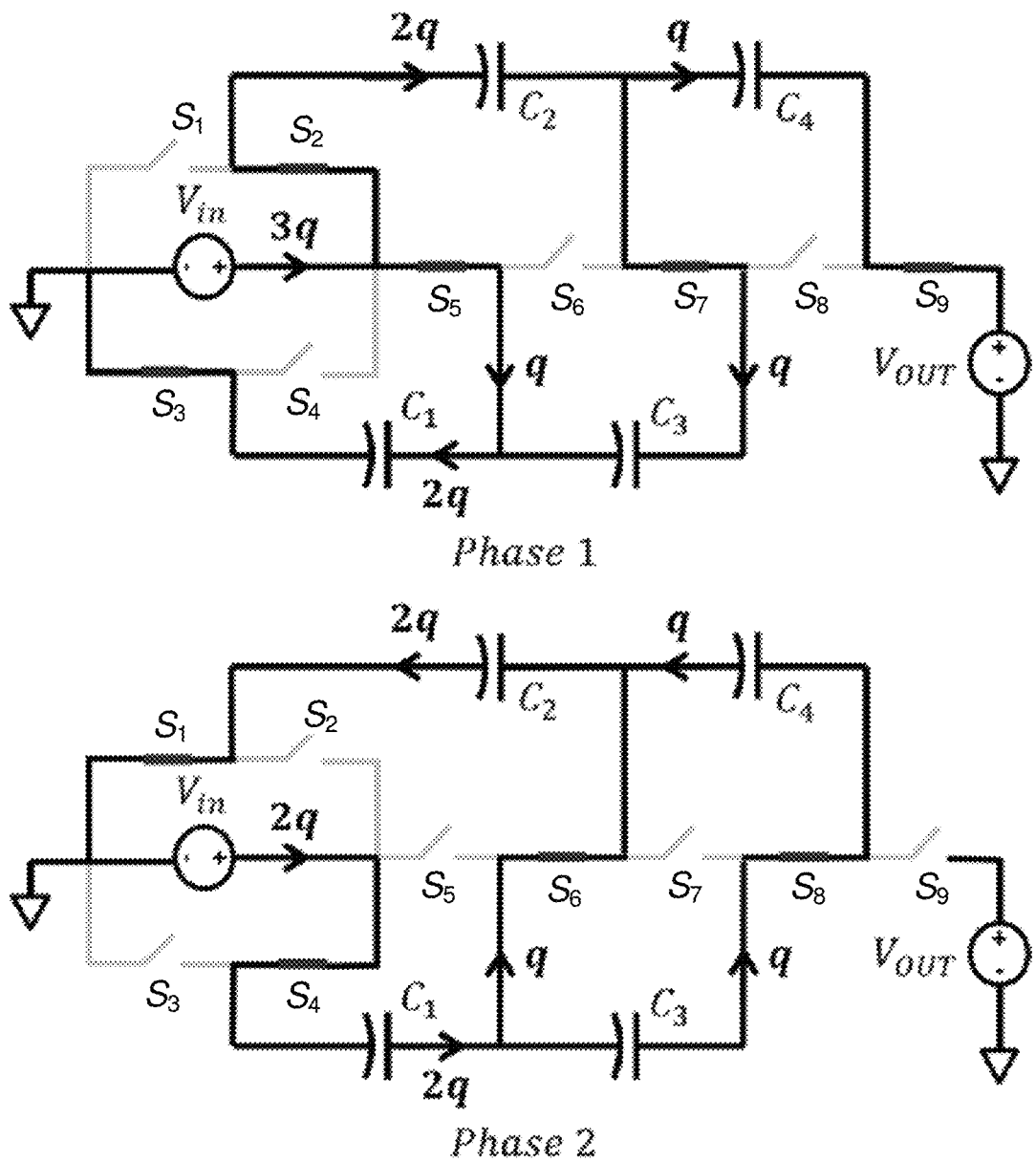
FIG. 2 shows the switching operation of the 1:5 CW SC converter of FIG. 1B under a conventional two (2)-phase switching scheme.

FIG. 2 shows the switching operation of the 1:5 CW SC converter of FIG. 1B under a conventional two (2)-phase switching scheme. Specifically, in Phase 1 of the 2-phase operation, switches $S_2$, $S_3$, $S_5$, $S_7$ and $S_9$ are turned on, whereas other switches are turned off (turned-off switches indicated in light grey); in Phase 2 of the 2-phase operation, switches $S_1$, $S_4$, $S_6$ and $S_8$ are turned on, whereas other switches are turned off (indicated in light grey). Due to the inherent parallelization of multiple capacitors and voltage sources across the two phases (i.e., Phase 1: $V_{IN}\|V_{C1}$, $V_{C2}\|V_{C3}$, $(V_{IN}+V_{C2}+V_{C4})\|V_{OUT}$; Phase 2: $(V_{IN}+V_{C1})\|V_{C2}$, $V_{C3}\|V_{C4}$), transient current pulses are inevitable due to rapid charge sharing, resulting in undesirable SSL operation and SSL losses.

Figure 3:
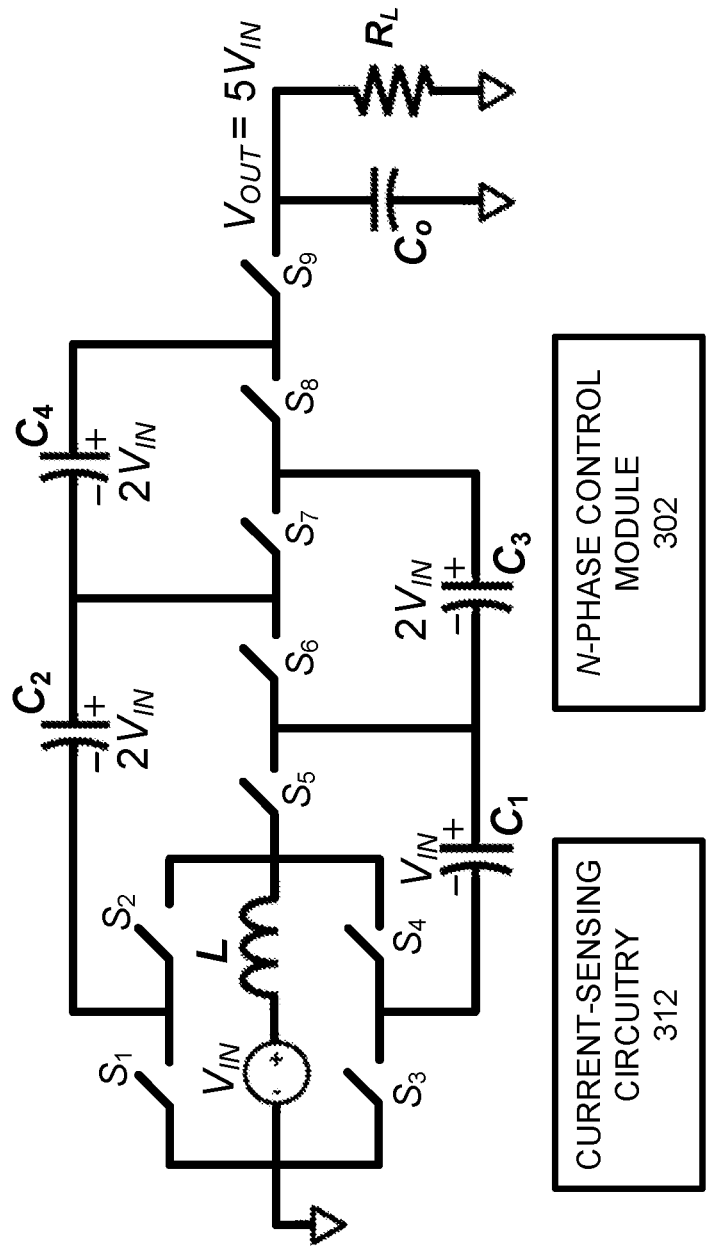
FIG. 3 shows an inductively-loaded hybrid-LC CW 1:5 switching converter and the voltage stress on the fly capacitors in accordance with some embodiments.

As described in the background section, by adding an inductive element in the hard-charged SC converter such as the 1:5 CW SC converter of FIG. 1B, the SSL losses can be significantly reduced by allowing resonant and soft-charging operations. FIG. 3 shows an inductively-loaded hybrid-LC CW 1:5 switching converter 300 and the voltage stress on the fly capacitors in accordance with some embodiments. As can be seen in FIG. 3, an inductor L is placed at the input of hybrid-LC CW 1:5 switching converter (or "hybrid CW converter") 300 between the input voltage source (or "input source," which has a DC voltage $V_{IN}$) and the switching capacitors. Note that when the same 2-phase switching scheme of FIG. 2 is applied to hybrid CW converter 300, inductor L functions as a high-frequency choke to inhibit/suppress the generations of the transient/inrush current pulses during the transitions between the two phases. Moreover, transient/inrush current pulses can be further suppressed by effectuating zero-current switching (ZCS) at the phase transitions. However, full ZCS across all switches in hybrid CW converter 300 cannot be achieved using the 2-phase switching scheme of FIG. 2. Note that it is possible to use more than one inductor in hybrid CW converter 300. For example, in addition to inductor L, another inductor can be placed at a location in hybrid CW converter 300 somewhere away from the input source. However, using multiple inductors generally leads to physically large converter designs.

N-Phase Resonant Cockcroft-Walton (CW) Switching Converters

Figure 4:
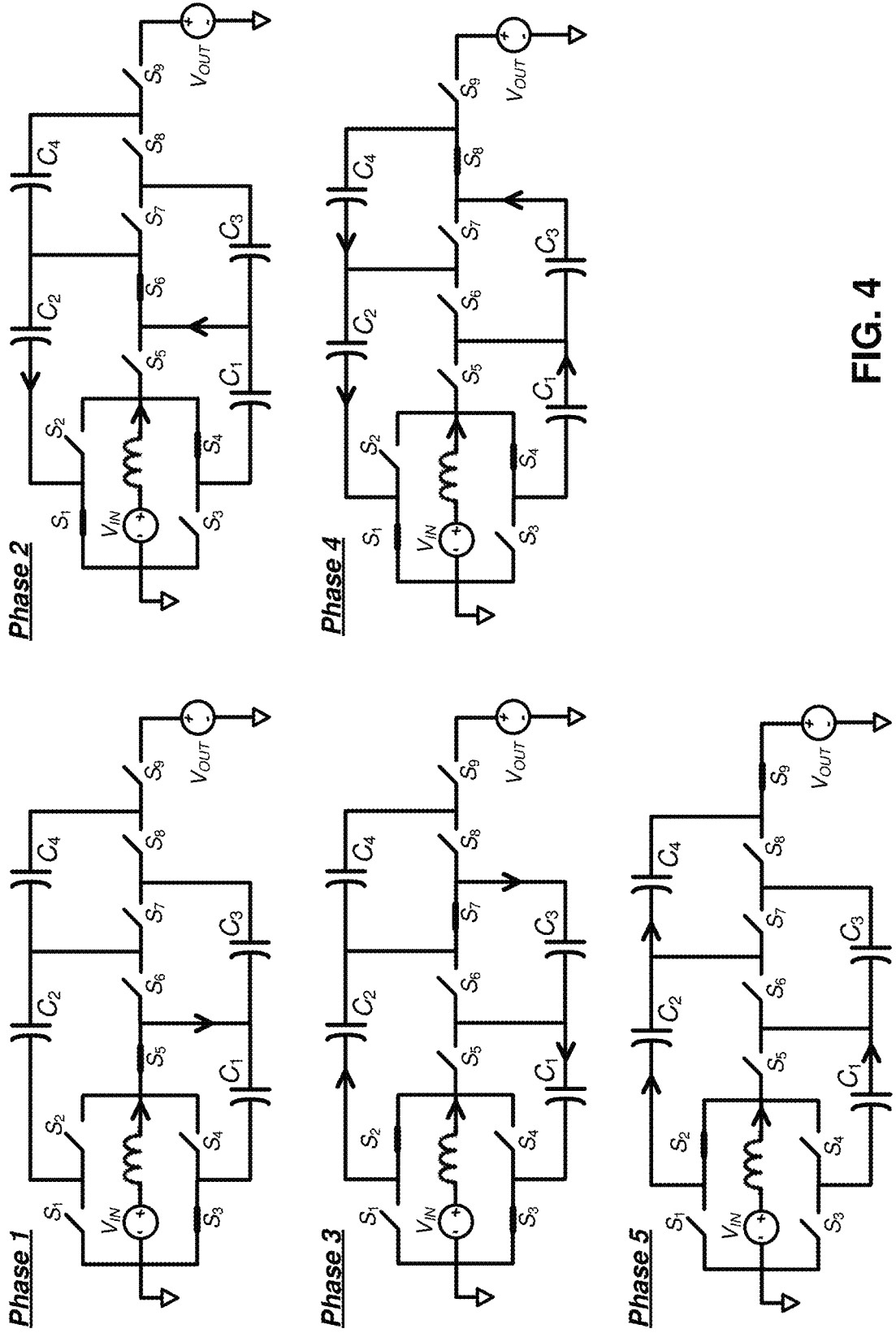
FIG. 4 shows an N-phase progression sequence of the proposed N-phase clocking scheme applied to the hybrid-LC 1:N (N=5) CW switching converter in FIG. 3 in accordance with some embodiments.

FIG. 4 shows an N-phase progression sequence 400 of a disclosed N-phase clocking scheme applied to hybrid-LC 1:N (N=5) CW switching converter 300 in FIG. 3 in accordance with some embodiments. We will show below that the disclosed N-phase clocking scheme (also interchangeably referred to as "the N-phase switching scheme" or "the disclosed N-phase switching scheme") effectuates an N-phase switching operation that can obtain a full zero-current switching (ZCS) across all switches within the hybrid-LC CW 1:N (N=5) switching converter 300 (or "1:N CW converter" hereinafter). While the exemplary CW switching converter 300 has a conversion ratio of N=5, the general concept of applying the disclosed N-phase clocking scheme to a hybrid 1:N CW converter can be extended to other CW voltage converter configurations having different conversion ratios N, i.e., wherein N can be greater than or less than 5. Moreover, while the exemplary CW switching converter 300 is a step-up converter, the disclosed N-phase clocking scheme can be modified, e.g., by reversing the order of the set of phases (described below), in step-down N:1 CW converters to achieve the identical effects of eliminating transient/inrush currents by achieving full ZCS operations and obtaining high conversion efficiencies.

As can be seen in FIG. 4, the disclosed N-phase progression sequence (or "N-phase sequence") 400 in the disclosed N-phase clocking scheme includes N=5 phases, wherein N is the conversion ratio. Under the control of the disclosed N-phase clocking scheme, 1:N CW converter operates in a cyclical/periodic manner by cycling through the periodic N-phase sequence 400 in each full operating period/cycle of the 1:N CW converter operation, and the disclosed N-phase sequence 400 is executed periodically during an overall CW converter operation. In other words, a full operating period/cycle can be expressed as: Phase 1→Phase 2→Phase 3→Phase 4→Phase 5. Next, a new operating period/cycle begins initiated by the phase transition of Phase 5→Phase 1. Moreover, as will be described in more detail below, the disclosed N-phase clocking scheme further governs the timings of phase transitions between each pair of consecutive phases (e.g., Phase 1→Phase 2, Phase 2→Phase 3, . . . , Phase 5→Phase 1, etc.) and also the duration of each of the N=5 phases. It can be observed that at any given time of the converter operation, only one phase of the N phases is selected and in operation. Hence, we may refer to the selected phase at a given time as the active phase.

Specifically, each of the N=5 phases is configured to include the input voltage source, the inductor L, and one or more fly capacitors ($C_1$, $C_2$, . . . , $C_4$) by selectively turning-on and/or turning-off one or more switches $S_1$ to $S_9$. More specifically, each phase in the N=5 phases is configured as a series RLC circuit that contains the input voltage source $V_{IN}$ (or "the input source"), the single inductor L coupled to the input source, and a unique subset of the set of capacitors and switches. Note also that the series RLC circuit associated with each phase in the N=5 phases forms a single closed voltage loop. Hence, Kirchhoff's Voltage Law (KVL) can be applied to each of the N=5 phases.

More specifically, Phase 1 of the disclosed N-phase sequence 400 includes the input source, inductor L, and capacitor $C_1$ with switches $S_3$ and $S_5$ turned on; Phase 2 of the disclosed N-phase sequence 400 includes the input source, inductor L, and capacitors $C_1$ and $C_2$ with switches $S_1$, $S_4$, and $S_6$ turned on; Phase 3 of the disclosed N-phase sequence 400 includes the input source, inductor L, and capacitors $C_1$, $C_2$ and $C_3$ with switches $S_2$, $S_3$, and $S_7$ turned on; Phase 4 of the disclosed N-phase sequence 400 includes the input source, inductor L, and capacitors $C_1$, $C_2$, $C_3$ and $C_4$ with switches $S_1$, $S_4$, and $S_8$ turned on; and finally Phase 5 of the disclosed N-phase sequence 400 includes the input source, inductor L, and capacitors $C_2$ and $C_4$ with switches $S_2$ and $S_9$ turned on. Note that in each of the 5 phases, the none-active circuit elements in the 1:N CW converter have been greyed-out. It can be observed that the disclosed N-phase clocking scheme progressively adds more fly capacitors into a new phase from Phase 1 to Phase 4 to form an increasingly bigger voltage loop, before the final Phase 5 is reached. In other words, N-phase clocking scheme starts with Phase 1 of N-phase sequence 400 which includes a single fly capacitor closest to the input voltage source, and progressively adds one capacitor in each subsequent phase until all fly capacitors are included at Phase 4. The final Phase 5 is then used to transfer the charge accumulated on $C_2$ and $C_4$ to the output of the 1:N CW converter, such as a resistive load.

Note that the active voltage loop of each phase in N-phase sequence 400, which includes the inductor L and the selected capacitors, is associated with a resonant frequency determined by L and the selected capacitors. However, different phases in N-phase sequence 400 generally have different resonant frequencies. In some embodiments, the disclosed N-phase clocking scheme includes a timing-control mechanism so that the closed loop circuit associated with each phase of the N phases experiences resonant operation. More specifically, this time-control mechanism determines the starting time and the ending time of each phase, and as such, the duration of each phase, and the starting time of the subsequent phase (i.e., the timing of an associated phase transition) are also determined by this time-control mechanism. In some embodiments, to mitigate/eliminate transient current pulses often associated with the transition from one phase to the next phase in a switching operation, the timing-control mechanism in the disclosed N-phase clocking scheme is configured to terminate an active phase once the current in inductor L (or "the inductor current") has returned to OA, referred to as a "ZCS condition." In other words, the timing-control mechanism in the disclosed N-phase clocking scheme is also configured to initiate the next active phase once the inductor current has returned to OA, i.e., when the ZCS condition is met.

Because each phase includes just one active voltage loop that includes the inductor, the disclosed N-phase clocking scheme ensures that all active switches experience ZCS at the moment when phase transition occurs. This controlled zero-current switching operation is also referred to as ZCS resonant operation. For example, at the moment when Phase 2 transitions into Phase 3 in N-phase sequence 400, the designed ZCS operation ensures that active switches $S_2$, $S_3$ and S₇ experience zero current at the moment of being turned-on. Similarly, at the moment when Phase 3 transitions into Phase 4, the designed ZCS operation ensures that active switches S₁, S₄ and S₈ experience zero current at the moment of being turned-on. In some embodiments, a single current sensing circuit 312, placed in series with the inductor L, can be used in each phase and reused for all N phases to detect when the ZCS condition is reached in an active phase. When such condition is detected, the sensing circuit 312 can generate a control signal to initiate a phase transition. Note that the above-described single current-sensing circuit 312 configuration simplifies the converter design and can more effectively reduce/eliminate transient current when compared with the existing multiple current sensor designs.

As described above, each phase in the disclosed N-phase clocking scheme is associated with a fixed phase duration which can be uniquely determined based on the circuit elements within the associated voltage loop, and the overall operating period of the disclosed hybrid CW converter is the sum of N phase durations (e.g., N=5) of all phases. As a result, the timings (i.e., the beginning and the end) of each phase in the disclosed N-phase clocking scheme and as such the timings of phase transitions within the disclosed N-phase clocking scheme can be controlled by a timer circuitry in place of the current sensing circuit described above.

Figure 5A:
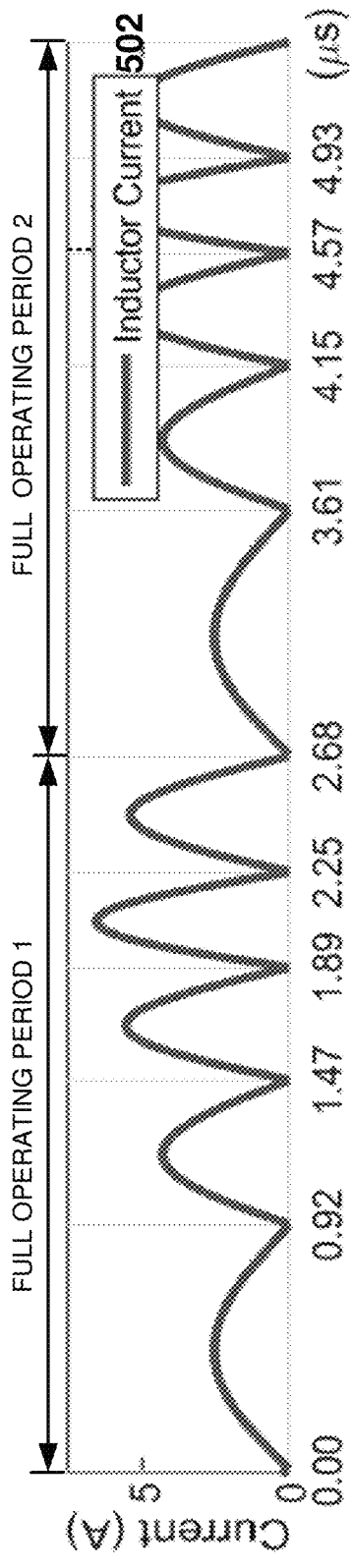
FIG. 5A shows the simulated inductor current waveform exhibiting ZCS conditions when the proposed N-phase clocking scheme is applied to a 1:N (N=5) CW converter in accordance with some embodiments.

FIG. 5A shows the simulated inductor current waveform 502 exhibiting ZCS conditions when the disclosed N-phase clocking scheme is applied to a 1:N (N=5) CW converter in accordance with some embodiments. To obtain the simulation results, a load of 160Ω, $V_{IN}$=18V, and ideal resistive switch models are used. Note that the simulated current waveform 502 includes two full operating cycles of the disclosed N-phase clocking scheme (N=5), each of which is composed of N=5 phases. It can be observed that the each phase of the 5-phase operation has a phase-duration equal to approximately half of the associated resonant period, wherein the inductor current starts at zero at the beginning of an active phase and returns to zero at the end of the same phase. Note also that each phase has a different resonant period from the other N−1 phases for the reasons described above. Moreover, only the half of the resonant period having the positive current values is allowed in the 5-phase operation to prevent undesirable behaviors on the active switches. In this manner, a subsequent phase in the 5-phase sequence after the active phase also starts with zero current and terminates with zero current while experiencing positive current throughout the phase duration. Clearly, the disclosed N-phase clocking scheme can eliminate a transient/inrush current pulse commonly associated with switching operations of the CW converters.

Figure 5B:
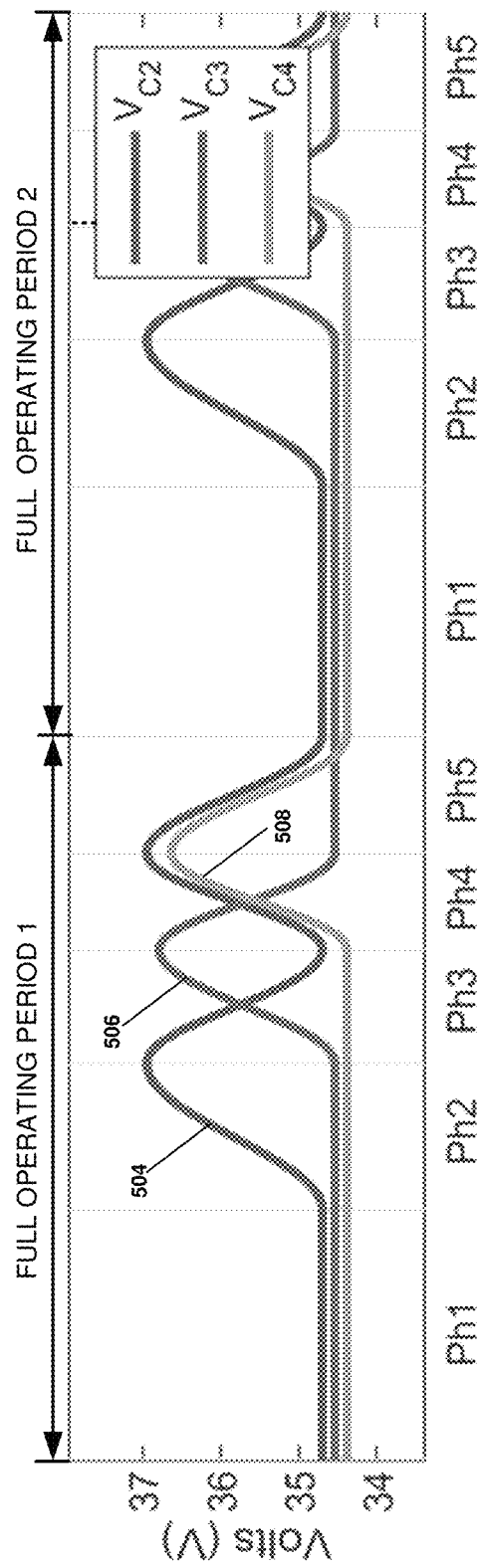
FIG. 5B shows the simulated voltage waveforms across fly capacitor $C_2$, $C_3$, $C_4$ when the proposed N-phase clocking scheme is applied to the 1:N (N=5) CW converter in accordance with some embodiments.

FIG. 5B shows the simulated voltage waveforms 504, 506, and 508 across fly capacitor $C_2$, $C_3$, $C_4$, respectively, in the disclosed N-phase clocking scheme applied to the 1:N (N=5) CW converter in accordance with some embodiments. Note that the smooth sinusoidal voltage transitions from one phase to the next phase across each of the fly capacitors $C_2$, $C_3$, $C_4$ indicates resonant switching operations without abrupt and inefficient charge sharing.

Generally speaking, to achieve the above-described ZCS resonant operation within the disclosed N-phase clocking scheme, each phase duration can be approximated by:

$$T_{n0} = \pi\sqrt{LC_n},  \quad \text{Eqn (1)}$$

wherein $C_n$ is the total effective capacitance seen by the input source during phase n (n=1, 2, . . . , N), wherein $T_{n0}$ represents a 180° half cycle of a natural resonant period. In some embodiments, the disclosed clocking scheme controls the actual phase durations $T_n$ (n=1, 2, . . . , N) to be equal to $T_{n0}$ above, thereby allowing the inductor current to resonate from 0A and to 0A, as shown in FIG. 5A. Note that if the actual phase durations $T_n$ were allowed to increase above $T_{n0}$, the disclosed 1:N CW converter would suffer a reversal of inductor current flow, with energy being returned ineffectively to the input source. If the actual phase durations are significantly greater than $T_{n0}$, then the switching operation becomes a hard-charging process wherein energy is dissipated through resistive losses. Both of these scenarios (i.e., $T_2 > T_{n0}$) are undesirable because they are associated with increasing output impedance variations with frequency.

While the disclosed N-phase clocking scheme can control the phase duration to be equal to $T_{n0}$ defined above, some embodiments of the disclosed N-phase clocking scheme can also allow actual phase durations $T_n$ to be slightly less than $T_{n0}$, such that the phase transition occurs when inductor current reduces to near zero but remains a positive value. In other words, the disclosed N-phase clocking scheme can configure the set of N-phase durations such that $T_n < T_{n0}$. This means that the actual switching frequency associated with a given phase in the N phases can be slight faster than the natural frequency determined based on Eqn (1) above, and as a result the full operating period of the disclosed N-phase clocking scheme can be shorter than the full ZCS resonant operating cycles depicted in FIGS. 5A and 5B, and the overall operating frequency of the 1:N (N=5) CW converter becomes faster.

Note that configuring phase durations $T_n < T_{n0}$ can improve the converter's resilience to component variations and mismatches by reducing or eliminating the possibility that the inductor current goes negative, a highly undesirable scenario in which converter performance degrades rapidly with increasing output impedance. Moreover, switching the phases faster than the natural resonances can also reduce the inductor's RMS current ripple. In practice, to what extent the individual switching frequency should be increased above the natural frequency for the disclosed CW converter is a design trade-off decision and can be highly dependent on specific component selections, performance, optimization, and reliability goals. For example, a greatly increased switching frequency may reduce AC core loss in the inductor, but at the same time also induced greater switching loss in the switching devices.

While the disclosed N-phase clocking scheme has been described in terms of using the periodic phase sequence to control the operations of 1:N step-up CW converters, other embodiments of the disclosed N-phase clocking scheme can be used to control the operations of N:1 step-down CW converters to achieve the identical benefits of eliminating transient/inrush switching currents. Using the 5-phase sequence 400 as an example, one embodiment can use the same 5 phases in a modified phase sequence, wherein the modified phases sequence reverses the order of the phase sequence 400. In other words, a periodic phase sequence of: Phase 5→Phase 4→Phase 3→Phase 2→Phase 1 can be used to control the step-down operation of a 5:1 step-down CW converter.

Moreover, while the disclosed N-phase clocking scheme has been described in terms of the periodic phase sequence 400 wherein the number of phases N is equal to the conversion ratio of the hybrid 1:N CW converter being controlled by disclosed N-phase clocking scheme, other embodiments of the disclosed N-phase clocking scheme can control the hybrid 1:N CW converter using alternative periodic phase sequences wherein the total number of phases in an alternative periodic phase sequence can be greater than N or fewer than N. By adding one or more additional phases into the nominal phase sequence of N phases, or by reducing one or more phases from the nominal phase sequence, the performance and/or functionality of the hybrid 1:N CW converter controlled by the disclosed N-phase clocking scheme can be adjusted.

Figure 6:
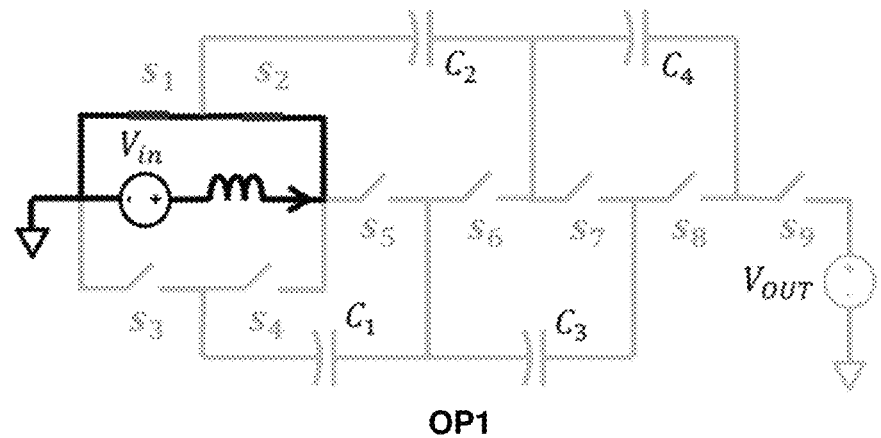
FIG. 6 shows three additional switch configurations of the hybrid 1:5 CW converter in FIG. 3 in accordance with some embodiments.
Figure 6:
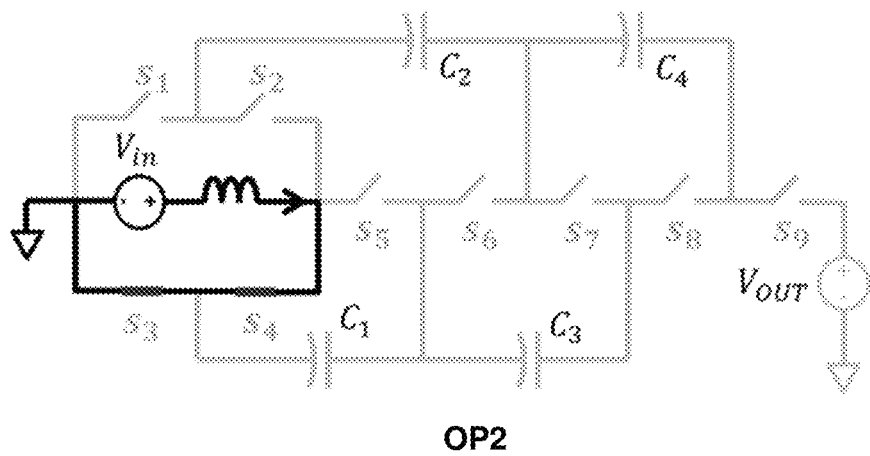
Figure 6:
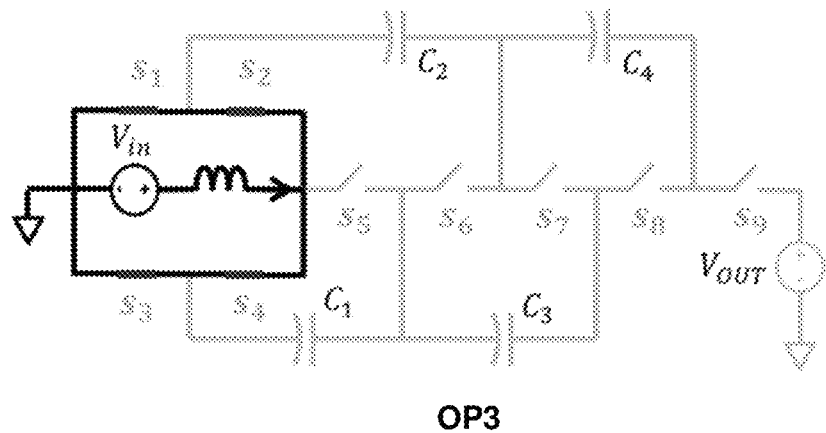

Using the hybrid 1:5 CW converter 300 as an example, some embodiments of the disclosed N-phase clocking scheme can include additional phases based on alternative switch configurations different from the 5 phases shown in FIG. 4. FIG. 6 shows three additional switch configurations of hybrid 1:5 CW converter 300, referred to as OP1, OP2, and OP3, respectively, in accordance with some embodiments. Specifically, OP1 is configured with only switches $S_1$ and $S_2$ turned on; OP2 is configured with only switches $S_3$ and $S_4$ turned on; and OP3 is configured by turning on switches $S_1$, $S_2$, $S_3$ and $S_4$. In some alternative embodiments of the disclosed N-phase clocking scheme, one or more of the switch configurations OP1, OP2, and OP3 can be inserted into the 5-phase periodic phase sequence 400 depicted in FIG. 4, so that the resulting phase sequence includes more than 5 phases. Note that by including one or more of these additional phase configurations, a hybrid 1:N CW converter's output voltage can be regulated and controlled such that the output voltage value can deviate from the nominal output voltage generally expected for the 1:N or N:1 conversion ratio. Moreover, by varying the duration(s) of the one or more additional phases with respect to the original phase durations, a 1:N CW converter's can be configured to exhibit a modified and controllable conversion ratio $N\_reg \geq N$.

In some embodiments, instead of configuring the periodic phase sequence so that the total number of phases in the phase sequence is greater than N, it is also possible to modify the set of N phases, e.g., by combining 2 phases into a single phase, so that the resulting phase sequence has less N phases. Using the 5-phase sequence 400 as an example, one embodiment can combine Phase 1 and Phase 3 into a single phase, e.g., by turning the switches associated with both phases on at the same time. Note that the resulting phase is a more complex phase including two voltage loops. Another embodiment can combine Phase 2 and Phase 4 into a single phase by turning the switches associated with both phases on at the same time. Note that in each of the above examples, the modified phase sequence includes 4 phases instead of 5. Generally speaking, using a modified phase sequence with a total number of phases less than the conversion ratio N could lead to some loss in conversion efficiency compared to using N phases.

Split-Phase Resonant CW Switching Converters

A split-phase switching technique mimics the naturally occurring near-ZVS of an inductively-loaded diode-based charge pump. By replacing diodes with active switches, this technique can reduce the loss due to forward voltage drop. However, when operated in resonant mode, this split-phase technique relies on timing sensitive ZVS at several switches throughout the converter and therefore further requires additional sensing circuitry when compared with the disclosed N-phase switching technique.

Figure 7:
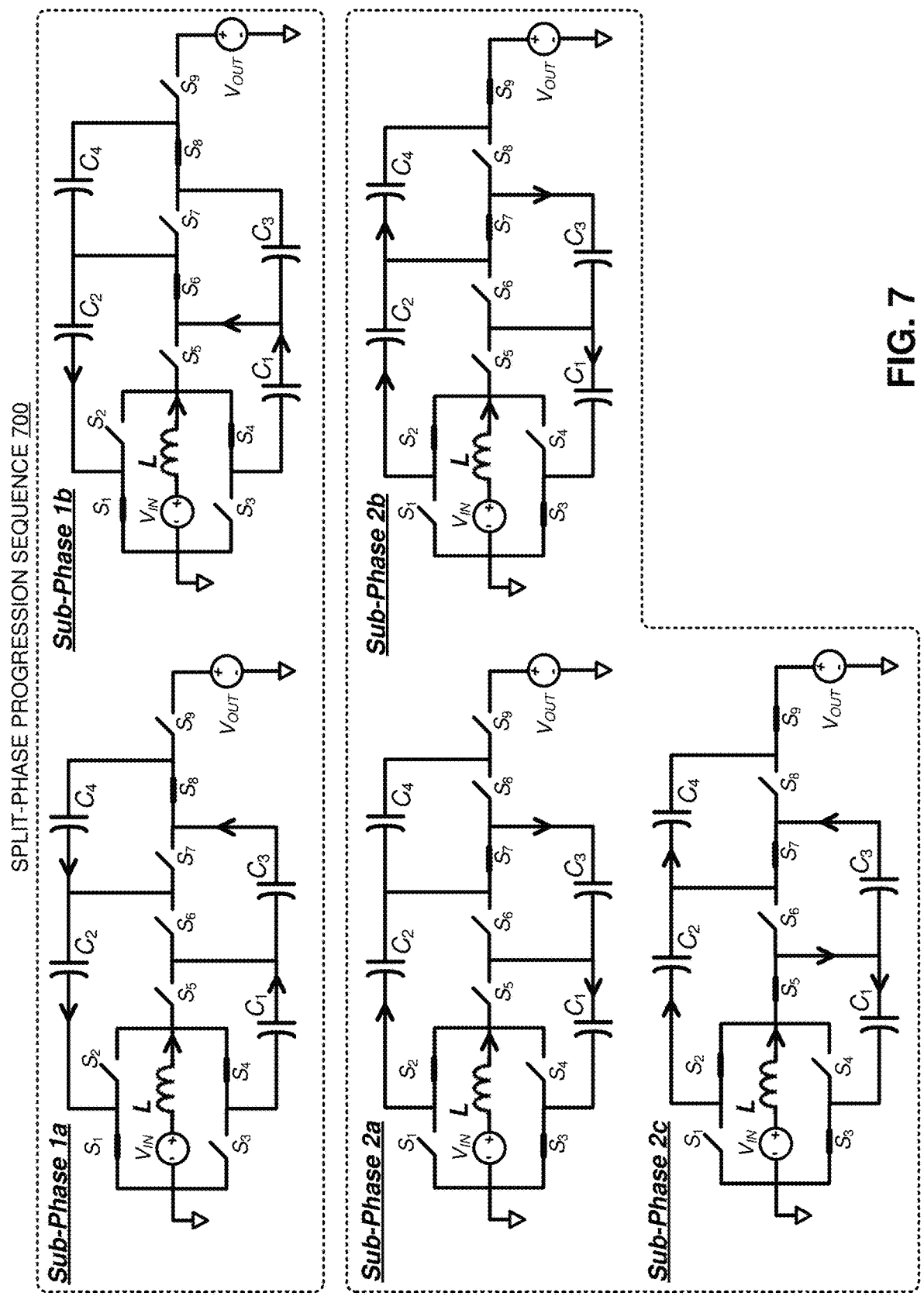
FIG. 7 shows an exemplary split-phase progression sequence of the proposed split-phase clocking scheme applied to the same hybrid-LC 1:N (N=5) CW switching converter in accordance with some embodiments.

FIG. 7 shows an exemplary split-phase progression sequence 700 of a disclosed split-phase clocking scheme applied to the same hybrid-LC 1:N (N=5) CW switching converter in accordance with some embodiments. We will show below that the disclosed split-phase clocking scheme (also interchangeably referred to as "the split-phase switching scheme" or "the disclosed split-phase switching scheme") effectuates a split-phase switching operation on the 1:N CW converter that can achieve full ZCS operations between major phases within each split-phase sequence and also achieve ZVS operations between sub-phases within the split-phase sequence. Again, while the exemplary CW switching converter 300 has a conversion ratio of N=5, the general concept of applying the disclosed split-phase clocking scheme to a hybrid 1:N CW converter can be extended to other CW voltage converter configurations having different conversion ratios N, i.e., wherein N can be greater than or less than 5. Moreover, while the exemplary CW switching converter 300 is a step-up converter, the disclosed split-phase clocking scheme can be modified, e.g., by reversing the order of the set of phases in step-down N:1 CW converters to achieve the identical benefits such as mitigating transient/inrush currents and obtaining high conversion efficiencies.

As can be seen in FIG. 7, the disclosed split-phase progression sequence (or "split-phase sequence") 700 in the disclosed split-phase clocking scheme includes N=5 total phases, wherein N is the conversion ratio. Under the control of the disclosed split-phase clocking scheme, 1:N CW converter operates in a cyclical/periodic manner by cycling through the periodic split-phase sequence 700 in each full operating period/cycle of the CW converter operation, and the disclosed split-phase sequence 700 is executed periodically during an overall CW converter operation. In other words, a full operating period/cycle can be expressed as: Sub-phase 1a→Sub-phase 1b→Sub-phase 2a→Sub-phase 2b→Sub-phase 2c. Next, a new operating period/cycle begins initiated by the phase transition of Sub-phase 2c→Sub-phase 1a. Moreover, as will be described in more detail below, the disclosed split-phase clocking scheme further governs the timings of phase transitions between each pair of consecutive phases (e.g., Sub-phase 1a→Sub-phase 1b, Sub-phase 2a→Sub-phase 2b, . . . , Sub-phase 2c→Sub-phase 1a, etc.) and also the duration of each of the N=5 phases. It can be observed that at any given time of the converter operation, only one phase of the 5 phases is selected and in operation. Hence, we may refer to the selected phase at a given time as the active phase.

Specifically, the disclosed split-phase clocking scheme includes two major phases: Phase 1 and Phase 2 which utilize the same switch configurations depicted in FIG. 2. However, each major phase is further segmented into a number of sub-phases or time intervals (i.e., Sub-phase 1a and Sub-phase 1b for Phase 1; Sub-phase 2a, Sub-phase 2b, and Sub-phase 2c for Phase 2) in which a subset of the switches associated with that major phase may be active. For example, in the embodiment depicted in FIG. 7, Sub-phase 1a includes switches $S_1$, $S_4$, and $S_8$, while Sub-phase 1b includes switches $S_1$, $S_4$, $S_6$, $S_8$. In contrast, Sub-phase 2a includes switches $S_2$, $S_3$, $S_7$, Sub-phase 2b includes switches $S_2$, $S_3$, $S_7$, and $S_9$, and Sub-phase 2c includes switches $S_2$, $S_3$, $S_5$, $S_7$, and $S_9$. Note that in each of the sub-phases, the none-active circuit elements in the 1:N CW converter have been greyed-out. As can be seen in FIG. 7, each of the major phases and sub-phases within the corresponding major phases is configured to include the input voltage source, the inductor L coupled to the input voltage source, and one or more fly capacitors ($C_1$, $C_2$, . . . , $C_4$) by selectively turning-on and/or turning-off one or more switches $S_1$ to $S_9$. However, unlike the single voltage loop topology of the phases in the disclosed N-phase sequence 400, the major phases in the disclosed split-phase sequence 700 can include multiple voltage loops. For example, Sub-phase 1b contains three voltage loops.

It can be observed in FIG. 7 that the initial Sub-phases 1a and 2a correspond to some of the phases in the disclosed N-phase sequence 400 because they only include a single voltage loop. However, dissimilar to the disclosed N-phase sequence 400 wherein each of N phases are generally maintained for a full 180° resonant half cycle, in the disclosed split-phase sequence 700, the set of sub-phases are generally included as part of a combined 1800 resonant half cycle which is constructed using all sub-phases contained within a corresponding major phase.

In some embodiments, the disclosed split-phase clocking scheme establishes the set of phases/sub-phases in two steps: Step 1, the switches available for use within the major phases are determined; and Step 2, the sub-phases for each of the major phases are determined. As mentioned above, the set of switches used within the major phases can be identical or substantially identical to the switches used within the phases of a conventional 2-phase CW switching scheme, such as the two phases described in conjunction with FIG. 2. Note that the multi-path nature of the phases in the conventional two-phase sequence and the unavoidable transient current pulses associated with these phases are the main causes of the SSL losses in the conventional CW switching scheme when only the two phases are used. For example, if we were to start the switching sequence with major phase 1 containing Sub-phase 1b only, i.e. without using Sub-phase 1a, the two fly capacitors $C_3$ and $C_4$ which are coupled in parallel and can each hold a different amount of charge, would cause a transient inrush current to flow between them in order to reach charge equilibrium, leading to conversion efficiency degradation. Hence, the disclosed split-phase clocking scheme includes two or more sub-phases within each major phase to prevent such transient current pulses from occurring.

Figure 8A:
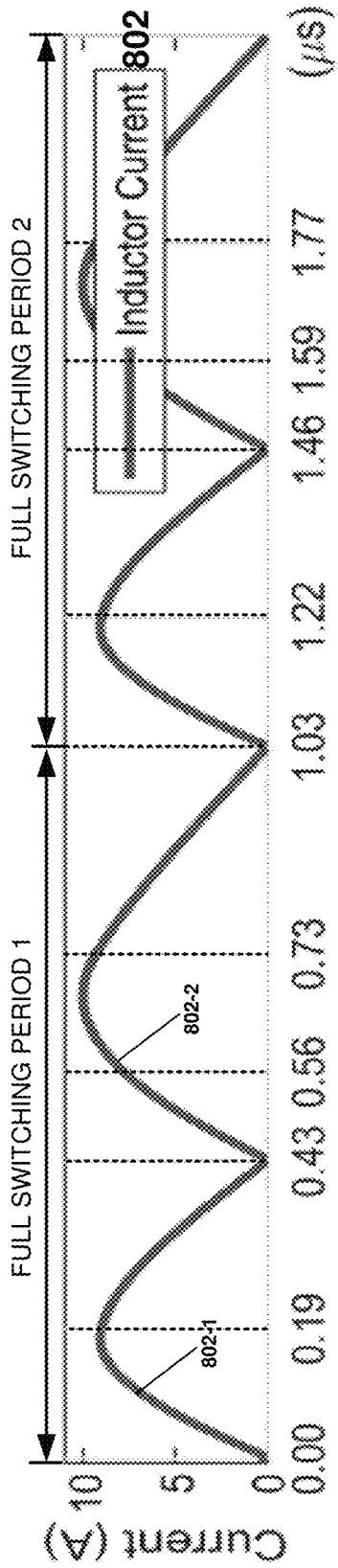
FIG. 8A shows the simulated inductor current waveform when the proposed split-phase clocking scheme is applied to the 1:N (N=5) CW converter in accordance with some embodiments.
Figure 8B:
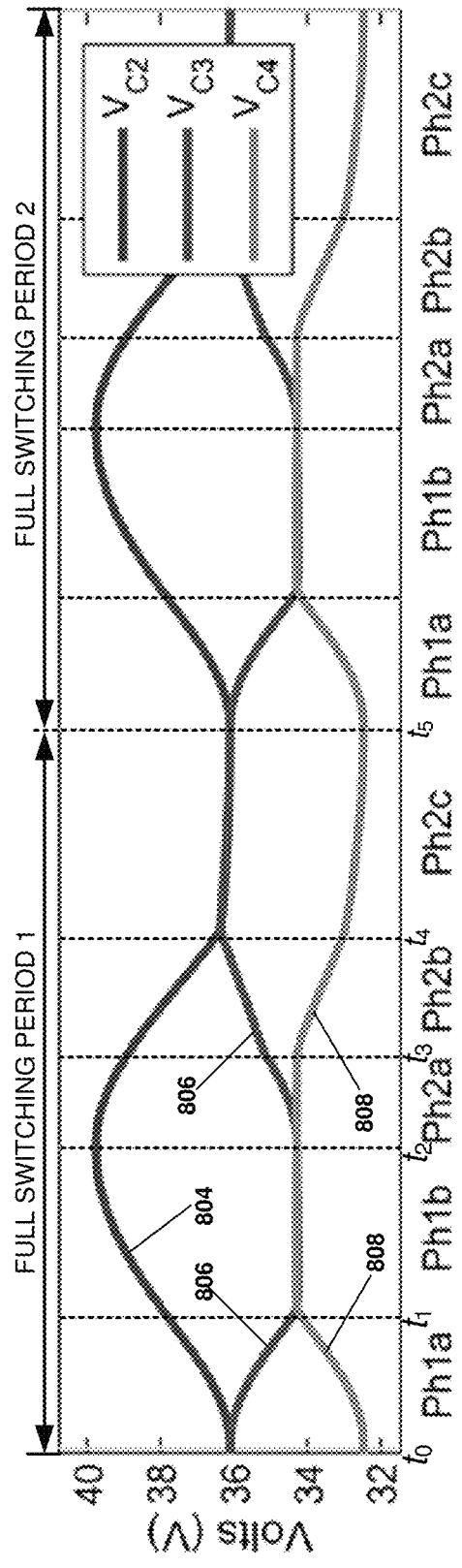
FIG. 8B shows the simulated voltage waveforms across fly capacitors $C_2$, $C_3$, and $C_4$ when the proposed split-phase clocking scheme is applied to the 1:N (N=5) CW converter in accordance with some embodiments.

The design choices for adding sub-phases within the major phases may be understood in conjunction with the simulated split-phase switching operation waveforms of FIGS. 8A and 8B. Specifically, FIG. 8A shows the simulated inductor current waveform 802 when the disclosed split-phase clocking scheme is applied to the 1:N (N=5) CW converter in accordance with some embodiments. From the inductor current waveform 802, each major phase can be clearly identified as the 180° half-period waveform between two adjacent ZCS points, e.g., half-period waveform 802-1 and half-period waveform 802-2 correspond to a pair of major phases, and the sum of the two half-period waveforms 802-1 and 802-2 corresponds to a full switching period of the disclosed split-phase switching scheme. Hence, two full switching/operating periods 1 and 2 of the disclosed split-phase switching scheme are included in the current waveform 802 in FIG. 8A. Similarly to the above-described N-phase clocking scheme, a single current sensing circuit placed in series with the inductor L can be used in each major phase to detect when ZCS condition occurs. When such condition is detected, the sensing circuit can generate a control signal to initiate a phase transition between the two major phases.

FIG. 8B shows the simulated voltage waveforms 804, 806, and 808 across fly capacitors $C_2$, $C_3$, and $C_4$ when the disclosed split-phase clocking scheme is applied to the 1:N (N=5) CW converter in accordance with some embodiments. Note that the voltage waveforms in FIG. 8B also include two full switching/operating periods 1 and 2 of the disclosed split-phase switching scheme. To facilitate visualizing the sub-phases and phase transitions within each major phase, a group of vertical lines along the time axis (horizontal axis) are added in FIG. 8A and FIG. 8B which breaks up each full switching period into the aforementioned five sequential sub-phases: Sub-phase 1a, Sub-phase 1b, Sub-phase 2a, Sub-phase 2b, and Sub-phase 2c.

We now describe the switching mechanism in a disclosed split-phase clocking scheme using both the circuit configurations for the set of split-phases in FIG. 7, and the simulated waveforms in FIG. 8B. As mentioned above, if we start the switching sequence from Sub-phase 1b without using Sub-phase 1a, the voltage/charge difference between two fly capacitors $C_3$ and $C_4$, which are coupled in parallel in Sub-phase 1b would cause a transient inrush current to flow between them in order to reach charge equilibrium. For example, FIG. 8B shows that $V_{C3}$ and $V_{C4}$ are significantly different at timestamp to, i.e., the beginning of a full switching period. Hence, the disclosed split-phase clocking scheme adds Sub-phase 1a (i.e., an additional sub-phase for major phase: Phase 1) prior to Sub-phase 1b, which in this case is a single voltage loop. Specifically in Sub-phase 1a, $C_3$ and $C_4$ are coupled in series and as the current flows around the voltage loop in the counter-clockwise direction, $C_3$ discharges while $C_4$ is charged up. This results in the decrease of $V_{C3}$ (curve 806) and the increase of $V_{C4}$ (curve 808) as clearly shown in FIG. 8B.

To avoid the above-mentioned transient current pulse, we want the phase transition from Sub-phase 1a to Sub-phase 1b to occur when $V_{C3}=V_{C4}$, i.e., when the ZVS condition for the first major phase is met (also referred to as the "first ZVS condition"). Note that the first ZVS condition also means that the voltage across switch $S_6$ in FIG. 7 becomes zero, so that turning-on switch $S_6$ does not induce any transient current pulse (hence the term ZVS). In some embodiments, the disclosed split-phase clocking scheme is configured to detect the exact moment when the first ZVS condition is met, i.e., when $V_{C3}=V_{C4}$ during Sub-phase 1a, indicated as time $t_1$ in FIG. 8B. As can be seen in FIG. 8B, this is the moment phase transition from Sub-phase 1a to Sub-phase 1b is allowed to occur, i.e., by turning on switch $S_6$ in FIG. 7. Note that the smooth voltage transitions on fly capacitors $C_3$ and $C_4$ at time $t_1$ indicate efficient energy transfer without abrupt charge sharing. Hence, by including Sub-phase 1a and controlling the timing of transitioning from Sub-phase 1a to Sub-phase 1b, the disclosed split-phase clocking scheme eliminates the transient inrush current typically associated with Sub-phase 1b when no other sub-phases are used. FIG. 8B also shows that throughout the entire duration of Sub-phase 1b, i.e., between timestamps $t_1$ and $t_2$, the first ZVS condition $V_{C3}=V_{C4}$ remains being satisfied.

At the end of the first major phase: Phase 1, i.e. at timestamp $t_2$, if we allow the CW converter to directly transition from Sub-phase 1b to the second major phase: Phase 2 without using Sub-phases 2a and 2b, i.e. skipping to Sub-phase 2c in which all switches used within major Phase 2 are activated, the voltage/charge difference between the two fly capacitors $C_2$ and $C_3$, which are coupled in parallel in Sub-phase 2c, would induce a transient inrush current to flow between them in order to reach charge equilibrium. For example, FIG. 8B shows that $V_{C2}$ (curve 804) and $V_{C3}$ (curve 806) are significantly different at timestamp $t_2$, i.e., the beginning of the second major phase of the full switching period. Hence, the disclosed split-phase clocking scheme adds Sub-phase 2a (i.e., the first sub-phase for major Phase 2) prior to Sub-phases 2b and 2c. Specifically in Sub-phase 2a, $C_2$ and $C_3$ are coupled in series and as the current flows around the voltage loop in the clockwise direction, $C_2$ discharges while $C_3$ is charged up. This results in the decrease of $V_{C2}$ (curve 804) and the increase of $V_{C3}$ (curve 806) as clearly shown in FIG. 8B.

While not directly observable in the capacitor voltage waveforms depicted in FIG. 8B, Sub-phase 2b is initialized after Sub-phase 2a upon realization of ZVS conditions on $S_9$. In other words, to avoid yet another transient current pulse, $S_9$ is turned on at the precise moment that the combined voltage across series-connected capacitors $C_1$, $C_3$ and $C_4$ is equal to that of the output voltage, i.e. when $V_{C1}+V_{C3}+V_{C4}=V_{OUT}$, thereby effectuating a transition from Sub-phase 2a to Sub-phase 2b. Note that in Sub-phase 2b, $C_2$ and $C_3$ remain coupled and conduct charge in the clockwise direction because the equilibrium between $C_2$ and $C_3$ has not yet been reached. However, since sub-phase 2b adds a second discharge path for $C_2$ into the circuit configuration (via $C_4$) less of its charge is directed towards $C_3$, and subsequently the charging rate of $C_3$ decreases. This is clearly shown in FIG. 8B where, at timestamp $t_3$, the charging rate of $C_3$ slows, while the voltage stored on $C_4$ begins to decrease.

Similarly, to avoid a further transient current pulse, we want the phase transition from Sub-phase 2b to Sub-phase 2c to occur when $V_{C2}=V_{C3}$, i.e., when the ZVS condition for $S_5$, as dictated by $C_2$ and $C_3$, is met. FIG. 8B shows that at timestamp $t_4$ this condition is met. Note that, similar to the previous two ZVS occurrences, the third ZVS condition also means that the voltage across switch $S_5$ in FIG. 7 becomes zero, so that turning-on switch $S_5$ does not induce any transient current pulse (hence the term ZVS). In some embodiments, the disclosed split-phase clocking scheme is configured to detect the exact moment when ZVS conditions are met, for example, when $V_{C2}=V_{C3}$ during Sub-phase 2b, indicated as time $t_4$ in FIG. 8B. As can be seen in FIG. 8B, this is the moment phase transition from Sub-phase 2b to Sub-phase 2c is allowed to occur, i.e., by turning on switch $S_5$ in FIG. 7. Note that the smooth voltage transitions on fly capacitors $C_2$ and $C_3$ at time $t_4$ indicate efficient energy transfer without abrupt charge sharing. Hence, by including the two additional Sub-phases 2a and 2b and controlling the timing of transitioning from Sub-phase 2a to Sub-phase 2b and Sub-phase 2b to Sub-phase 2c, the disclosed split-phase clocking scheme eliminates the transient inrush current typically associated with a two-phase scheme in which no sub-phases are used. FIG. 8B also shows that throughout the entire duration of phase 2c, i.e., between timestamps $t_4$ and $t_5$, the second ZVS condition $V_{C2}=V_{C3}$ remains satisfied. Finally, the first full switching period of the disclosed split-phase clocking scheme ends at $t_5$ and as indicated in FIG. 8A, this is also the moment when ZCS condition is met when the inductor current returns to zero. Subsequently, next full switching period begins, and the disclosed split-phase switching sequence repeats.

In summary, the disclosed split-phase clocking scheme includes two types of phase transitions: (1) major phase transitions; and (2) sub-phase transitions or in-phase transitions. Generally speaking, the major phase transitions, e.g., from major Phase 1 to major Phase 2, or from major Phase 2 to major Phase 1 are allowed to occur when the ZCS condition on the inductor is met. Separately, the sub-phase transitions or in-phase transitions are used to break down each major phase into two or more sub-phases, wherein each of the two or more sub-phases has a different circuit configuration as defined by active switches that are drawn from a set of switches unique to the encompassing major phase. Generally speaking, a transition from a first sub-phase to a second sub-phase within a major phase is allowed to occur when a corresponding ZVS condition associated with the second sub-phase is met.

Comparison N-Phase Clocking Scheme with Split-Phase Clocking Scheme

By comparing the phase transition sequences of both disclosed converter clocking schemes applied to the hybrid-LC 1:5 CW converter (FIGS. 4 and 7), it can be observed that the N-phase clocking scheme exhibits an increased switching activity of 13 switch cycles per switching period (by counting the number of times new switches are turned on within one switching period of the N-phase switching scheme) in contrast to the split-phase clocking scheme which exhibits 9 switch cycles (by counting the number of times new switches are turned on within one switching period of the split-phase switching scheme). However, as can be observed from the simulation results in FIGS. 5A and 8A, when identical circuit components are used in the hybrid-LC 1:5 CW converter, the N-Phase switching scheme operates significantly slower (e.g., over 60% slower in the simulated results using arbitrary component values listed in FIG. 14) than the split-phase switching scheme when both schemes are operated at resonance. This results from the N-phase switching scheme offering an overall operating period that is a summation of N resonant half-cycles, whereas the disclosed split-phase switching scheme has an operating period comprised of just two composite resonant half-cycles, thereby providing a shorter overall operating period, or faster frequency of switching operation. As a result, despite its increased switching activity, the N-phase switching scheme experiences an overall reduction in switching losses, thereby significantly improving conversion efficiencies at light-load conditions. Note that the simplified sensing hardware requirement (no distributed ZVS detection required) and associated losses for the N-phase switching scheme can further improve the increased efficiencies in a commercial implementation.

Figure 9:
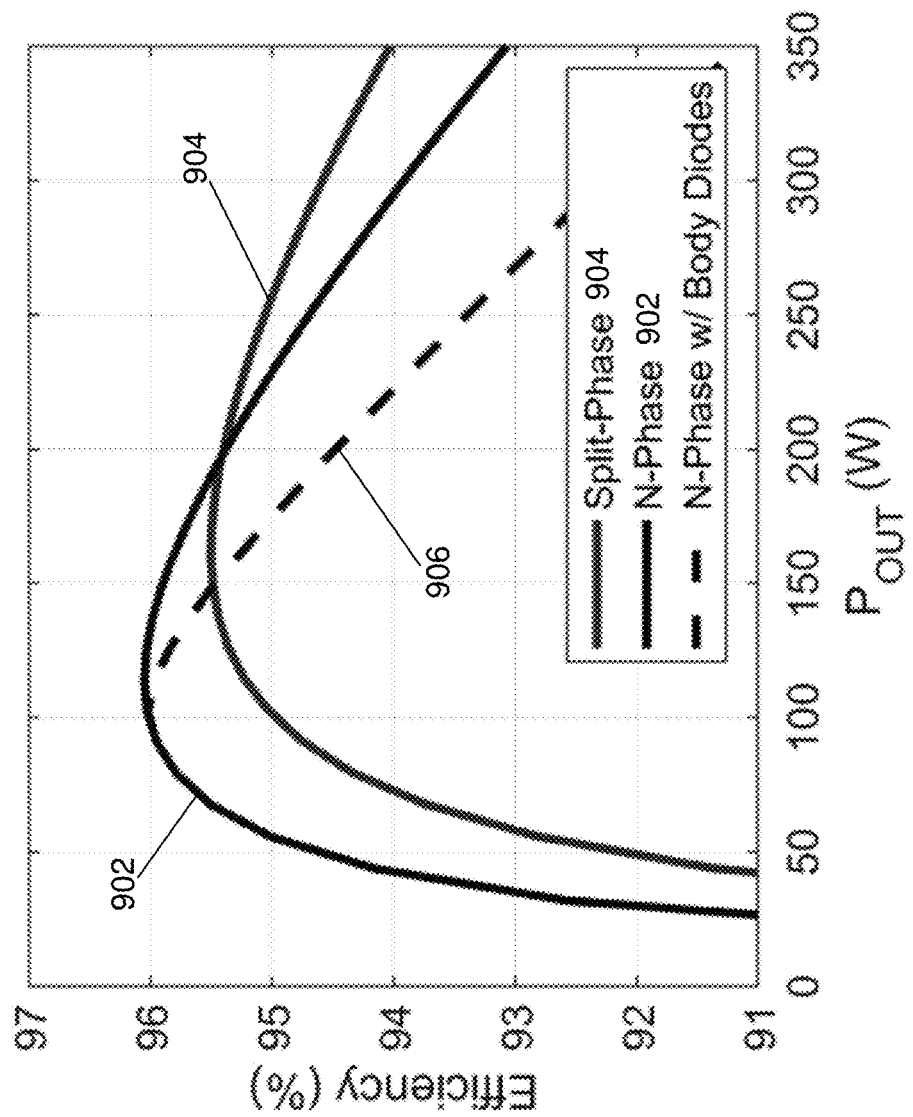
FIG. 9 shows simulated converter efficiency versus the output power plots for both of the proposed clocking schemes applied to the same hybrid-LC 1:5 CW converter in accordance with some embodiments.

FIG. 9 shows simulated converter efficiency versus the output power plots for both of the disclosed clocking schemes applied to the same hybrid-LC 1:5 CW converter in accordance with some embodiments. Specifically, curve 902 corresponds to the disclosed N-phase clocking scheme and curve 904 corresponds to the disclosed split-phase clocking scheme. The simulation results show that the disclosed split-phase clocking scheme can achieve highest efficiencies under heavy-load conditions, whereas the disclosed N-phase clocking scheme can offer highest efficiencies under light-load conditions. For example, at $P_{OUT}$=100 W, the N-phase switching scheme delivers a 20% reduction in losses over the split-phase switching scheme with the improvement margin widening significantly at even lighter loads. However, both disclosed clocking schemes can achieve significant efficiency improvements over conventional 2-phase switching schemes.

FIG. 9 also shows a projected efficiency curve 906 if the body diode turn-on effect in the MOSFET switches is included in the simulation. Note that this effect is unique to the disclosed N-phase clocking scheme and further limits the heavy-load efficiency of the N-phase clocking scheme. This result further justifies that the disclosed split-phase clocking scheme has performance advantage over the N-phase clocking scheme during heavy-load operations. It is worth noting that in the case of gallium nitride (GaN) MOSFET switches, the increased intrinsic body diode forward voltage of GaN MOSFET, compared to that of the silicon MOSFET, may actually serve to improve efficiency for reverse biases less than 2V. However, once this reverse bias is exceeded, losses can accumulate quickly. To prevent such losses caused by reverse bias, back-to-back NMOS transistors may be employed for switches experiencing a reverse bias, which may in turn increase conduction and dynamic losses. Consequently, whether or not the back-to-back NMOS approach should be taken will depend on several factors, including available devices, operating point, complexity, and cost.

Note that because both the disclosed N-phase clocking scheme and the disclosed split-phase clocking scheme can be implemented using the same hardware, a combined control scheme which incorporates both of the disclosed clocking schemes can be implemented to provide the benefits from each of the disclosed clocking schemes and the added benefit of selecting between the two disclosed clocking schemes. In other words, the combined control/clocking scheme can be used to strategically select a more favorable switching-control technique between the disclosed N-phase clocking scheme and the disclosed split-phase clocking scheme based on the operating condition/point (e.g., different load conditions), thereby ensuring that converter efficiency is always maximized across a wide range of operating conditions (e.g., a wide load range). As an example, in the case of FIG. 9, the proposed combined control scheme can be configured to select the disclosed N-phase clocking scheme for loads less than 150 W, and to select the disclosed split-phase clocking scheme for heavier loads, e.g., when loads are greater than 200 W.

Note that both the disclosed N-phase clocking scheme and the disclosed split-phase clocking scheme contain multiple identical phases: e.g., Phase 3 in the N-phase clocking scheme and Sub-phase 2a in the split-phase clocking scheme; or Phase 4 in the N-phase clocking scheme and sub-phase 1a in the split-phase clocking scheme. As such, the proposed combined control/switching scheme may include one or more transition points and a control logic can be designed to transition between the disclosed N-phase clocking scheme and the disclosed split-phase clocking scheme at one of these transition points. In some embodiments, a hybrid clocking/switching scheme can be established by including some or all phases from the disclosed N-phase clocking scheme and some or all phases from the disclosed split-phase clocking scheme. Such a hybrid clocking/switching scheme may arrange the set of combined phases from both disclosed clocking schemes in such a way to yield a maximized efficiency curve over the entire load range.

In some embodiments, to further improve light-load efficiency in each of the disclosed N-phase clocking scheme and the split-phase clocking scheme, a pulse-frequency-modulation (PFM) technique or a dynamic off-time modulation (DOTM) technique may be applied to either the N-phase clocking scheme or the split-phase clocking scheme. Note that due to the inherent light-load advantage of the N-phase clocking scheme over the split-phase clocking scheme, applying above modulation techniques to the N-phase clocking scheme may be preferred at light-load operations.

Implementations

Figures 10A, 10B:
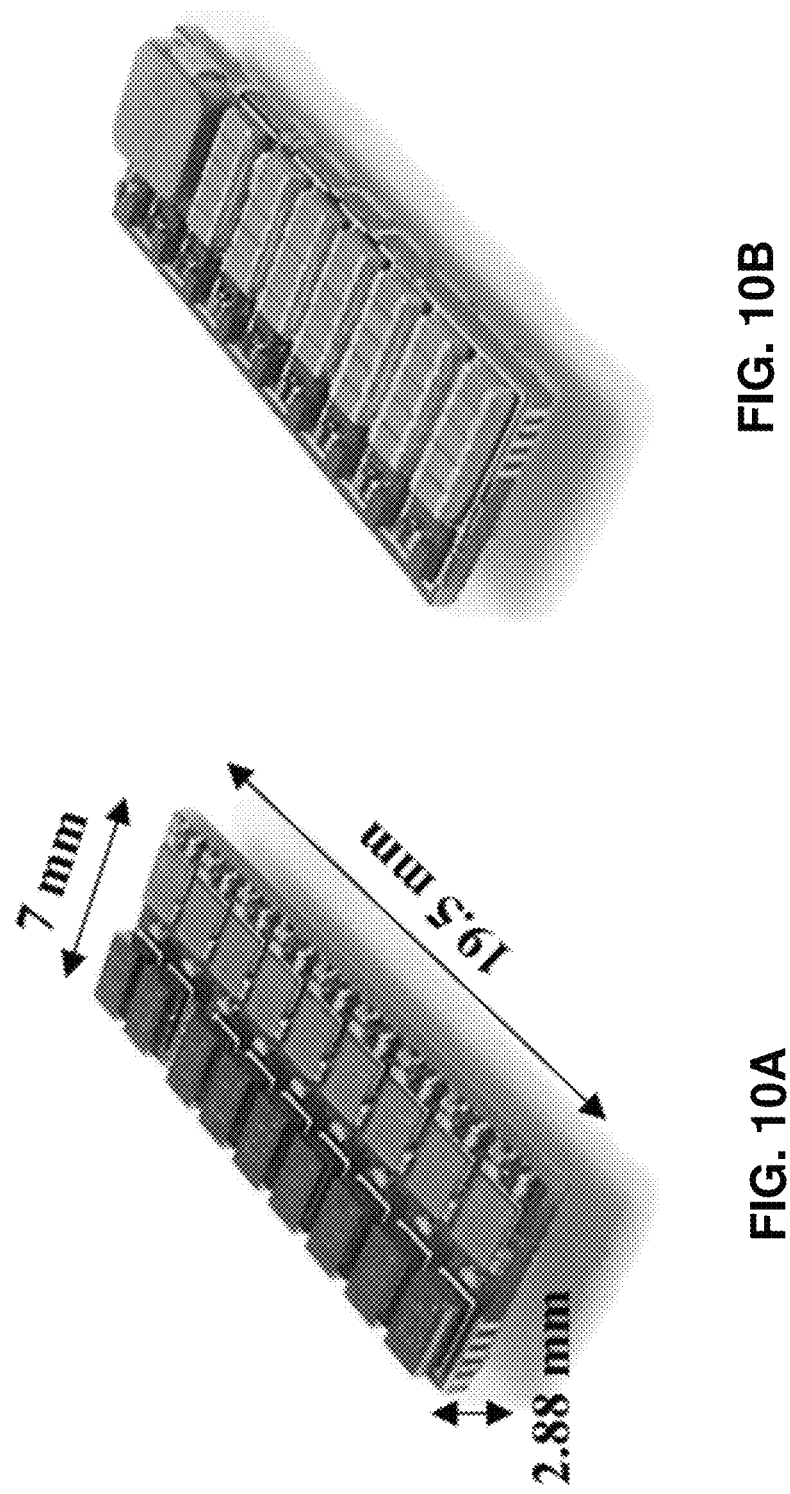
FIG. 10A shows a photograph of the top PCB (Printed Circuit Board) side of a discrete hybrid 1:5 CW converter prototype which implements the proposed multi-phase clocking schemes in accordance with some embodiments.
FIG. 10B shows a photograph of the bottom PCB side of the same discrete hybrid 1:5 CW converter prototype which implements the proposed multi-phase clocking schemes in accordance with some embodiments.

FIG. 10A shows a photograph of the top PCB (Printed Circuit Board) side of a discrete hybrid 1:5 CW converter prototype which implements the disclosed multi-phase clocking schemes in accordance with some embodiments; whereas FIG. 10B shows a photograph of the bottom PCB side of the same discrete hybrid 1:5 CW converter prototype which implements the disclosed multi-phase clocking schemes in accordance with some embodiments. More specifically, the top PCB side of the discrete hybrid 1:5 CW converter prototype includes switches constructed using gallium nitride (GaN) FETs, gate-driver circuitry, and level-shifting circuitry, whereas the bottom PCB side of the discrete hybrid 1:5 CW converter prototype includes the inductor, the fly capacitors, and bootstrapping circuitry. In some embodiments, the converter prototype has a total volume of 393 mm$^3$ calculated by a best-fit cuboid enclosing all active circuitry except the low voltage clock generation (a Tektronix HFS9003 stimulus system in this specific example). FIG. 14 lists the components used in the discrete hybrid 1:5 CW converter prototype in accordance with some embodiments. The prototype was assembled on a low-cost 0.8 mm PCB. As such, more advanced assembly techniques on thinner substrates could potentially reduce solution volume significantly.

Figure 11:
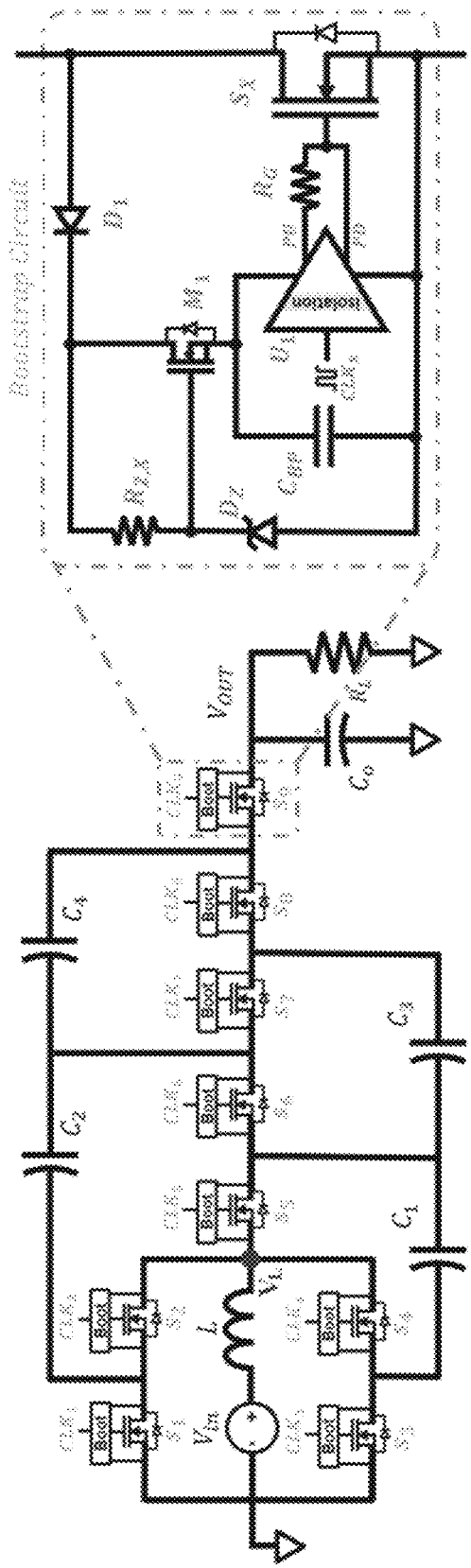
FIG. 11 shows the schematic of an exemplary implementation of the disclosed hybrid 1:5 CW converter and associated gate-driver circuitry in accordance with some embodiments.

FIG. 11 shows the schematic of an exemplary implementation of the disclosed hybrid 1:5 CW converter and associated gate-driver circuitry in accordance with some embodiments. As can be seen in FIG. 11, each of the nine switches $S_1$ to $S_9$ is implemented with a MOSFET, such as a GaN MOSFET, wherein each MOSFET switch also has a dedicated gate-driver bootstrapping circuit which is shown in a detailed implementation in the inset of FIG. 11. In the bootstrapping circuit shown, circuit elements Zener diode $D_Z$, resistor $R_{Z,X}$, transistor $M_1$ and diode $D_1$ collectively operate as a high-speed voltage regulator. Separate pull-up/down outputs on the gate-driver allow independent clock edge tuning for reliability at high switching speed. In some embodiments, the gate driver for each of the MOSFET switches is powered by tapping energy off of the forward power path.

More specifically, charge is fed onto the bypass capacitance, labeled $C_{BP}$ in the inset of FIG. 11, during the time interval(s) that the primary switch is off, capitalizing on the blocking potential that accumulates across the primary switch. To achieve this effect, a 5.6V Zener diode reference $D_Z$ is source-followed through $M_1$, effectuating a high-speed voltage regulator with minimal quiescent draw or start-up timing requirements. Diode $D_1$ functions to restrict reverse current from flowing out of the driver circuitry when the primary switch is on or reverse-biased. This voltage regulating technique was implemented for its simplicity which provides independence to each gate-driver, avoiding bootstrapping problems such as overcharging and diminishing supply voltage due to successive diode drops throughout a distributed bootstrap network.

Figure 12A:
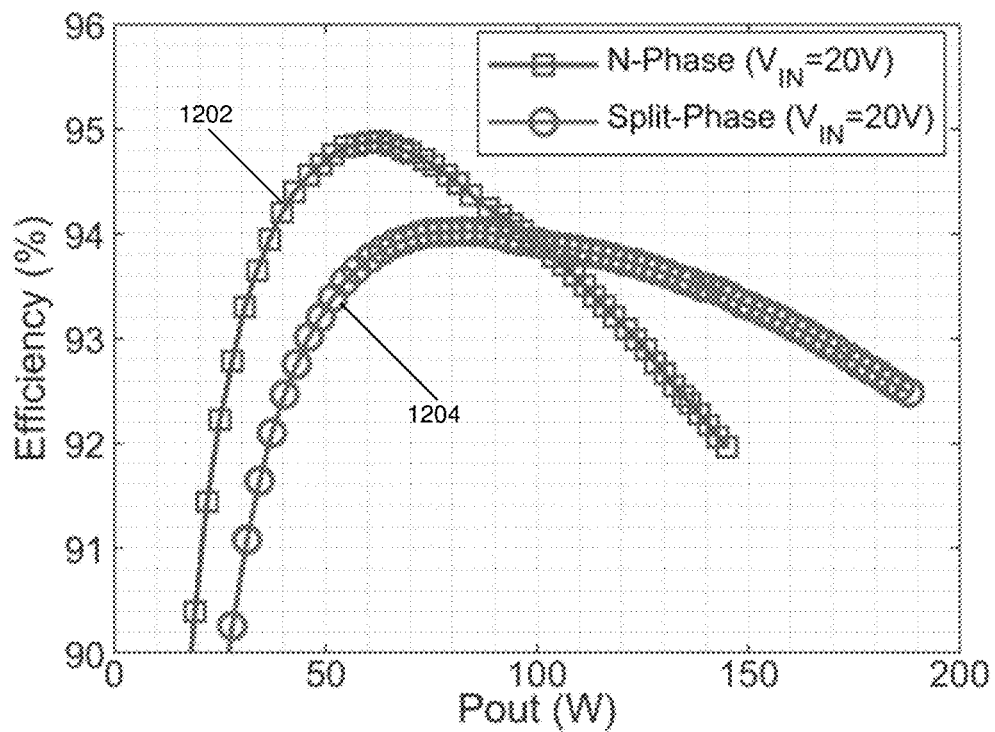
FIG. 12A shows the measured efficiency versus output power curves for both disclosed N-phase and split-phase clocking schemes applied to the same CW converter hardware and $V_{IN}$=20V in accordance with some embodiments.
Figure 12B:
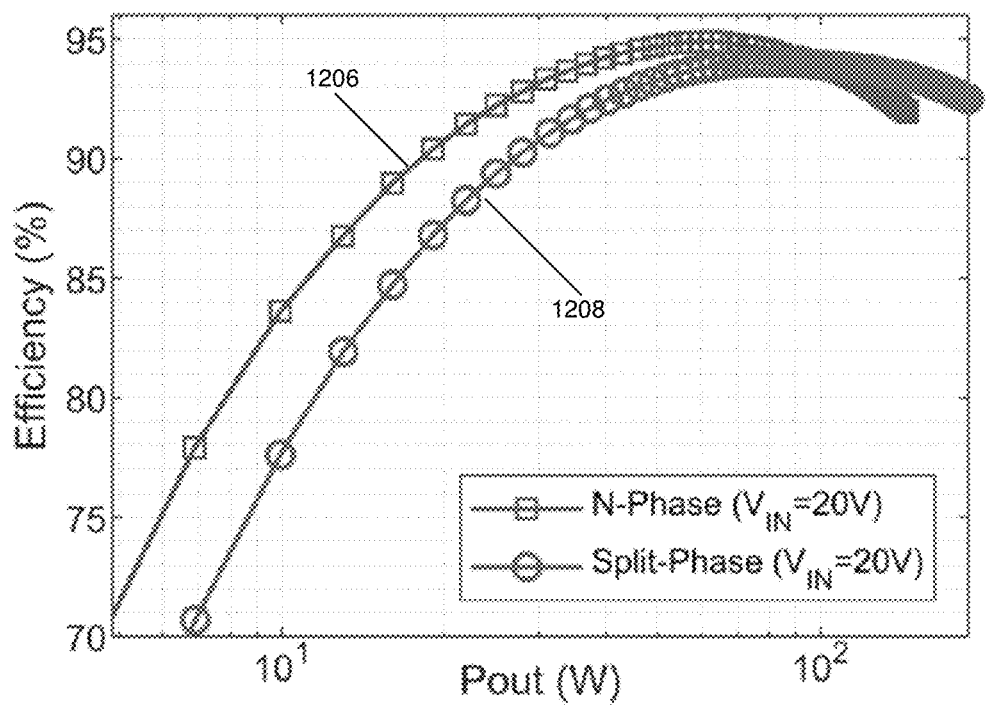
FIG. 12B shows the measured light-load efficiency versus output power curves for both disclosed N-phase and split-phase clocking schemes applied to the same CW converter hardware and $V_{IN}$=20V in accordance with some embodiments.

FIG. 12A shows the measured efficiency versus output power plot for both disclosed N-phase and split-phase clocking schemes applied to the same CW converter hardware and $V_{IN}$=20V in accordance with some embodiments. Specifically, curves 1202 and 1204 in the plot correspond to the N-phase clocking scheme and the split-phase clocking scheme, respectively. FIG. 12B shows the measured light-load efficiency versus output power plot for both disclosed N-phase and split-phase clocking schemes applied to the same CW converter hardware and $V_{IN}$=20V in accordance with some embodiments. This plot allows a truncated light-load portion of the measured results not visible in FIG. 12A to become visible. Specifically, curves 1206 and 1208 in FIG. 12B correspond to the N-phase clocking scheme and the split-phase clocking scheme in FIG. 12B, respectively. As can be observed and as expected from FIGS. 12A and 12B, the split-phase clocking technique provides the highest output powers at the heavy-load range, whereas the N-phase clocking technique exhibits up to a 30% reduction in losses at light load conditions, making it the preferred switching/clocking scheme in the light-load region of operation.

Figure 13:
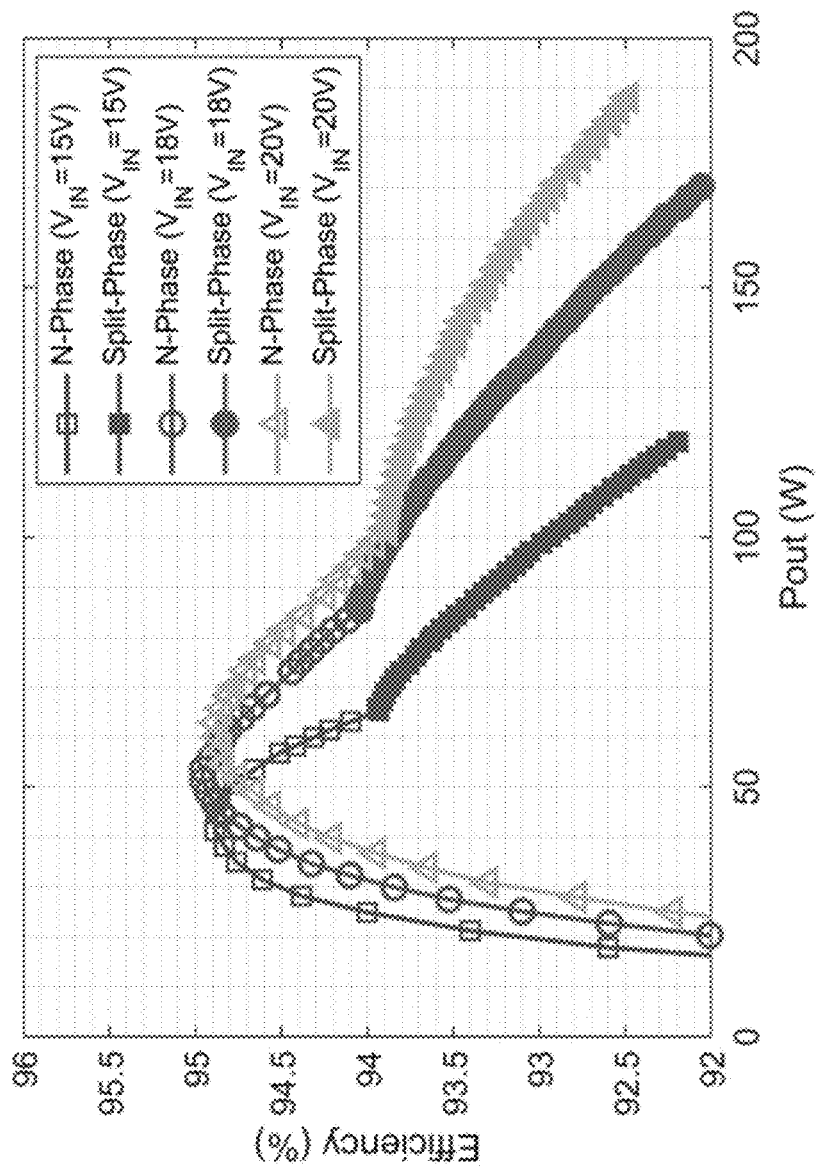
FIG. 13 shows measured efficiency versus output power curves for a number of different input voltages $V_{IN}$, with the optimal clocking/switching scheme (either the N-phase or the split-phase) selected for each operating point to maximize the efficiencies in accordance with some embodiments.

FIG. 13 shows measured efficiency versus output power curves for a number of different input voltages $V_{IN}$, with the optimal clocking/switching scheme (either the N-phase or the split-phase) selected for each operating point to maximize the efficiencies in accordance with some embodiments. Hence, the efficiency curves shown in FIG. 13 effectively represent the performance of the combined N-phase and split-phase clocking scheme described above. Note that because these ZCS resonant converters being compared all have a fixed conversion ratio, the output voltage generally decreases with increased load. In some embodiments, to achieve an improved output voltage regulation at a given input voltage $V_{IN}$, switching frequency of either the selected N-phase clocking scheme or the selected split-phase clocking scheme can be increased until the converter enters soft-charging for the selected clocking schemes and/or one or more of the additional phase configurations depicted in FIG. 6 may be included.

With the proliferation of chip-scale packaging of power components, dramatic increases in power density can be achieved with diverse technologies available in co-packaged modules. Some prototype devices which combine these available technologies with the disclosed switching-converter control techniques in this disclosure have demonstrated extremely high power density of 483.3 kW/liter (7,920 W/inch3), when including the disclosed gate drivers, level-shifting, and gate driver power delivery, wherein ~75% of the total volume was taken up by the PCB and free space. Improved substrates and assembly processes can expect to increase this power density metric even further. Various disclosed switching control techniques applied to hybrid CW switching converters have achieved high-efficiency CW switching converter with large conversion ratios and significant reduction in volume and/or weight of such converters, making the disclosed technique attractive for several commercial applications, including mobile devices (e.g., backlight), biomedical devices (e.g., High Intensity Focused Ultrasound (HIFU)), and distributed power systems (e.g., solar, server racks, aviation).

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A Cockcroft-Walton (CW) switching voltage converter, comprising:
    a set of capacitors;
    at least one inductor coupled between an input voltage source and the set of capacitors;
    a set of switches; and
    an N-phase control module coupled to the set of switches, wherein each switch in the set of switches is controlled by the N-phase control module which is configured to sequentially and periodically effectuate a set of N voltage-conversion phases for each switching cycle in a sequence of switching cycles, wherein each switching cycle in the sequence of switching cycles effectuates a voltage conversion through the set of N voltage-conversion phases, and wherein N is the conversion ratio of the CW switching voltage converter, and
    wherein the N-phase switching module is configured to effectuate a phase transition from a current phase in the set of N voltage-conversion phases to a subsequent phase in the set of N voltage-conversion phases when a current through the at least one inductor in the current phase decreases to zero or substantially zero, thereby effectively achieving full zero-current switching (ZCS) across the set of switches and the set of N voltage-conversion phases.

2. The CW switching voltage converter of claim 1, wherein each phase in the set of N voltage-conversion phases is configured to include only one closed voltage loop that is composed of, the input voltage source, the at least one inductor, a subset of the set of capacitors, and a subset of the set of switches.

3. The CW switching voltage converter of claim 2, wherein each phase in the set of N voltage-conversion phases is associated with a phase duration that is determined based on a natural resonant period of the associated closed voltage loop.

4. The CW switching voltage converter of claim 3, wherein the phase duration of the phase in the set of N voltage-conversion phases is equal to or substantially equal to 50% of the natural resonant period of the associated closed voltage loop.

5. The CW switching voltage converter of claim 3, wherein the phase duration of the phase in the set of N voltage-conversion phases is less than 50% of the natural resonant period of the associated closed voltage loop so that the current through the at least one inductor remains positive throughout a switching cycle.

6. The CW switching voltage converter of claim 1, wherein the CW switching voltage converter further includes a current-sensing circuitry coupled to the at least one inductor and configured to detect a ZCS condition in the at least one inductor in each phase of the set of N voltage-conversion phases.

7. The CW switching voltage converter of claim 6, wherein the N-phase control module is configured to effectuate a phase transition when the output value of the current sensing circuitry reaches a minimum value.

8. The CW switching voltage converter of claim 1, wherein the set of N voltage-conversion phases is configured such that an earlier phase in the set of N voltage-conversion phases generally includes fewer capacitors than a number of capacitors included in a latter phase in the set of N voltage-conversion phases.

9. The CW switching voltage converter of claim 1, wherein the N-phase control module is configured to add one or more additional voltage-conversion phases into each switching cycle, wherein the one or more additional phases are combined with the set of N voltage-conversion phases to regulate an output voltage of the CW switching voltage converter to a desired level.

10. The CW switching voltage converter of claim 1, wherein the N-phase switching technique operates using three or more voltage-conversion phases, whereby N≥3.

11. The CW switching voltage converter of claim 1, wherein the CW switching voltage converter includes a 1:N step-up CW switching voltage converter.

12. The CW switching voltage converter of claim 1, wherein the CW switching voltage converter includes a N:1 step-down CW switching voltage converter.

13. The CW switching voltage converter of claim 1, wherein the N-phase control module is further configured to reduce the number of phases within each switching cycle by combining two phases in the set of N voltage-conversion phases into a single phase and subsequently using the set of N−1 voltage-conversion phases for each switching cycle.

14. The CW switching voltage converter of claim 1, wherein the N-phase control module is configured to start each phase in the set of N voltage-conversion phases under a first ZCS condition and terminate the same phase under a second ZCS condition, thereby increasing conversion efficiencies of the voltage converter by elimination transient current pulses typically associated with phase transitions and increasing conversion efficiencies.

15. The CW switching voltage converter of claim 1, wherein an output of the CW switching voltage converter is only coupled to the input voltage source during the Nth phase of the set of N voltage-conversion phases.

16. A switched-capacitor voltage converter, comprising:
a Cockcroft-Walton (CW) voltage converter, which includes an inductor placed in proximity to an input for the step-up voltage conversion or placed in proximity to an output for the step-down Cockcroft-Walton voltage conversion;
wherein the voltage converter is configured to operate using an N-phase switching technique, wherein the N-phase switching technique includes a set of N voltage-conversion phases per conversion cycle and N is also the conversion ratio of the CW voltage converter, and is also configured to operate using a split-phase switching technique; and
wherein the voltage converter is configured to use the split-phase switching technique when a power output of the voltage converter exceeds an empirically determined and/or predetermined efficiency tradeoff point, and is otherwise configured to use the N-phase switching technique when the power output equals or falls below the efficiency tradeoff point.

17. The switched-capacitor voltage converter of claim 16, wherein during the N-phase technique, switches in the voltage converter are controlled so that only one current path exists through the voltage converter and the inductor during each of the N phases; and
wherein a transition from a first phase to a second phase during the N-phase technique takes place when current through the inductor equals zero, whereby full zero-current switching is achieved.

18. The switched-capacitor voltage converter of claim 17, wherein the transitions between subsequent phases alternatively take place at a higher frequency than a natural self-resonant frequency of the voltage converter to facilitate soft-charging.

19. The switched-capacitor voltage converter of claim 18, wherein additional phases may be added or an existing phase may be removed in order to regulate the output voltage to a desired value.

20. The switched-capacitor voltage converter of claim 16, wherein during the split-phase technique, switches in the voltage converter are controlled so that the voltage converter transitions between two major phases, which are associated with different configurations of the switches, and wherein each major phase is split into sub-phases, which are associated with different sub-configurations of the switches;
wherein a transition between the two major phases takes place when a current through the inductor equals zero, whereby full zero-current switching is achieved; and
wherein a transition between two sub-phases within each of the two major phase takes place when a voltage across a switch being added during the transition between the two sub-phases has becomes zero.

21. The switched-capacitor voltage converter of claim 20, wherein the transitions between the two major phases alternatively take place at a higher frequency than a natural self-resonant frequency of the voltage converter to facilitate soft-charging.

22. The switched-capacitor voltage converter of claim 21, wherein additional phases may be added or an existing phase may be removed in order to regulate the output voltage to a desired value.

23. The switched-capacitor voltage converter of claim 22, wherein the two major phases include a first major phase, which is split into N/2 sub-phases when N is even, and (N−1)/2 sub-phases when N is odd; and a second major phase, which is split into N/2 sub-phases when N is even, and (N+1)/2 sub-phases when N is odd, wherein N is the conversion ratio of the switched-capacitor converter.

24. The switched-capacitor voltage converter of claim 16, wherein additional Pulse Frequency Mode (PFM) and/or other light load switching techniques may also be incorporated to improve the light load efficiency of the switched-capacitor voltage converter.

25. The switched-capacitor voltage converter of claim 16, wherein capacitors in the Cockcroft-Walton voltage converter are selected so that voltage ripple is maximized to take full advantage of capacitor energy density, subject to the constraint that voltage tolerances are not exceeded.

* * * * *

UNITED STATES PATENT AND TRADEMARK OFFICE
CERTIFICATE OF CORRECTION

PATENT NO. : 11,979,089 B2
APPLICATION NO. : 17/393291
DATED : May 7, 2024
INVENTOR(S) : Nathan Miles Ellis It is certified that error appears in the above-identified patent and that said Letters Patent is hereby corrected as shown below:

In the Claims

In Claim 23 (Column 24, Line 48) delete the word "Nis" and replace with --$N$ is--

In Claim 23 (Column 24, Line 49) delete the word "Nis" and replace with --$N$ is--

In Claim 23 (Column 24, Line 50) delete the word "Nis" and replace with --$N$ is--

In Claim 23 (Column 24, Line 51) delete two occurrences of the word "Nis" and replace with --$N$ is--

Signed and Sealed this
Eighteenth Day of June, 2024

Katherine Kelly Vidal
*Director of the United States Patent and Trademark Office*